United States Patent
Schultz et al.

(10) Patent No.: US 8,928,760 B2
(45) Date of Patent: Jan. 6, 2015

(54) RECEIVING CONTENT AND APPROVING CONTENT FOR TRANSMISSION

(75) Inventors: Paul T. Schultz, Colorado Springs, CO (US); Umashankar Velusamy, Tampa, FL (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 227 days.

(21) Appl. No.: 12/980,608

(22) Filed: Dec. 29, 2010

(65) Prior Publication Data

US 2012/0140083 A1 Jun. 7, 2012

Related U.S. Application Data

(63) Continuation-in-part of application No. 12/961,852, filed on Dec. 7, 2010.

(51) Int. Cl.
| | |
|---|---|
| *H04N 5/225* | (2006.01) |
| *H04N 5/228* | (2006.01) |
| *H04N 21/234* | (2011.01) |
| *H04N 21/25* | (2011.01) |
| *H04N 21/258* | (2011.01) |
| *H04N 21/2665* | (2011.01) |
| *H04N 21/2743* | (2011.01) |
| *H04N 21/414* | (2011.01) |
| *H04N 21/422* | (2011.01) |
| *H04N 21/4223* | (2011.01) |
| *H04N 21/475* | (2011.01) |
| *H04N 21/4788* | (2011.01) |
| *H04N 21/2187* | (2011.01) |

(52) U.S. Cl.
CPC ........... *H04N 21/234* (2013.01); *H04N 21/252* (2013.01); *H04N 21/25841* (2013.01); *H04N 21/2585* (2013.01); *H04N 21/2665* (2013.01); *H04N 21/2743* (2013.01); *H04N 21/41407* (2013.01); *H04N 21/42202* (2013.01); *H04N 21/4223* (2013.01); *H04N 21/4756* (2013.01); *H04N 21/4788* (2013.01); *H04N 21/2187* (2013.01)
USPC ..................................... 348/207.1; 348/222.1

(58) Field of Classification Search
USPC ..................... 348/231.2, 218.1, 207.1, 222.1; 382/284
See application file for complete search history.

(56) References Cited

U.S. PATENT DOCUMENTS

| | | | |
|---|---|---|---|
| 6,972,787 B1 | 12/2005 | Allen et al. | |
| 7,688,379 B2 * | 3/2010 | Forman et al. | ................. 348/356 |
| 8,244,179 B2 | 8/2012 | Dua | |
| 2002/0085762 A1 * | 7/2002 | Shniberg et al. | ............... 382/224 |
| 2003/0179405 A1 * | 9/2003 | Seto | ............................. 358/1.15 |
| 2005/0130680 A1 | 6/2005 | Northcutt | |

(Continued)

OTHER PUBLICATIONS

Copending U.S. Appl. No. 12/961,852, filed Dec. 7, 2010 entitled: "Broadcasting Content".

*Primary Examiner* — Mekonnen Dagnew

(57) ABSTRACT

User imaging terminals (such as mobile phones with camera or video functionality) may be used to take images that are used to create an image stream of an event. In one implementation, a device may receive the images and transmit the images to one or more second users. The device may receive indications, from the second users, of whether the images are approved by the second users for incorporation into an image stream; and generate the image stream, based on the images that are approved by the second users. The image stream may be transmitted to one or more display devices.

25 Claims, 12 Drawing Sheets

(56) References Cited

U.S. PATENT DOCUMENTS

| | | |
|---|---|---|
| 2005/0218215 A1 | 10/2005 | Lauden |
| 2006/0242679 A1 | 10/2006 | Hutchison et al. |
| 2008/0109729 A1* | 5/2008 | Notea et al. .................. 715/722 |
| 2008/0235353 A1 | 9/2008 | Cheever et al. |
| 2008/0297409 A1 | 12/2008 | Klassen et al. |
| 2009/0022357 A1 | 1/2009 | Katz |
| 2009/0063048 A1 | 3/2009 | Tsuji |
| 2009/0093776 A1* | 4/2009 | Yue et al. ..................... 604/272 |
| 2009/0132519 A1* | 5/2009 | Rathod et al. ..................... 707/5 |
| 2009/0133059 A1* | 5/2009 | Gibbs et al. ..................... 725/34 |
| 2009/0228204 A1 | 9/2009 | Zavoli et al. |
| 2010/0182436 A1 | 7/2010 | Boman et al. |
| 2010/0241755 A1 | 9/2010 | Bassett et al. |
| 2010/0325194 A1 | 12/2010 | Williamson et al. |
| 2011/0013038 A1 | 1/2011 | Kim et al. |

* cited by examiner

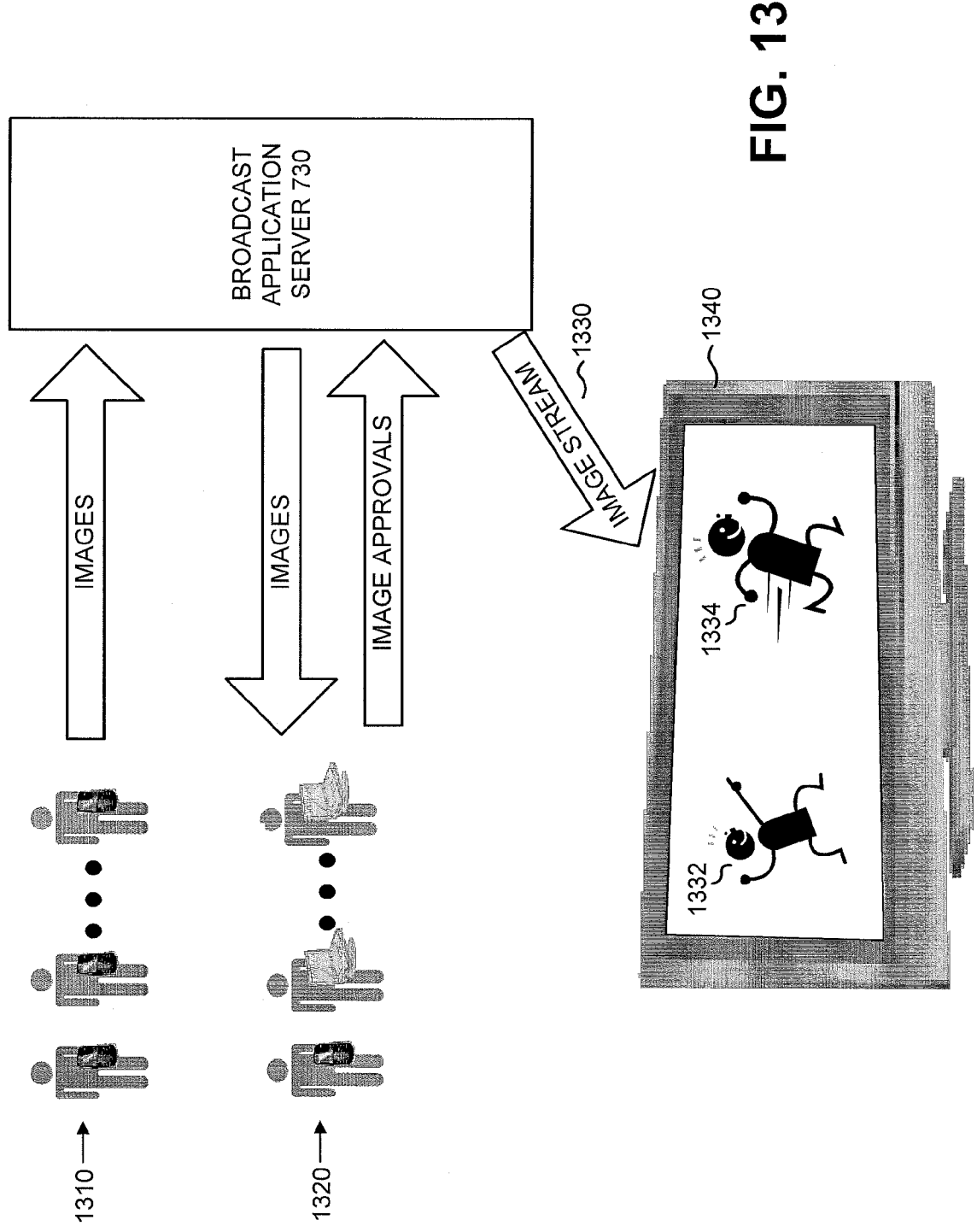

RECEIVING CONTENT AND APPROVING CONTENT FOR TRANSMISSION

RELATED APPLICATIONS

This application claims priority from and is a continuation-in-part (CIP) of U.S. patent application Ser. No. 12/961,852, filed Dec. 7, 2010, entitled "BROADCASTING CONTENT," the disclosure of which is incorporated herein by reference.

BACKGROUND

As wireless network data rates improve using third generation (3G), fourth generation (4G), and WiFi technologies, users are using wireless networks for more and more bandwidth-intensive applications. Delivery of video content is becoming more popular with applications provided via mobile communication devices, such as smart phones (e.g., the Motorola DROID, the iPhone, etc.). At the same time, sharing of information through social networks is also becoming increasingly popular. However, options remain limited with regards to what information may be shared and how the information may be shared.

BRIEF DESCRIPTION OF THE DRAWINGS

FIG. 13 is a diagram that illustrates an example of an application of broadcasting content using broadcast application server.

DETAILED DESCRIPTION OF PREFERRED EMBODIMENTS

Figure 1:
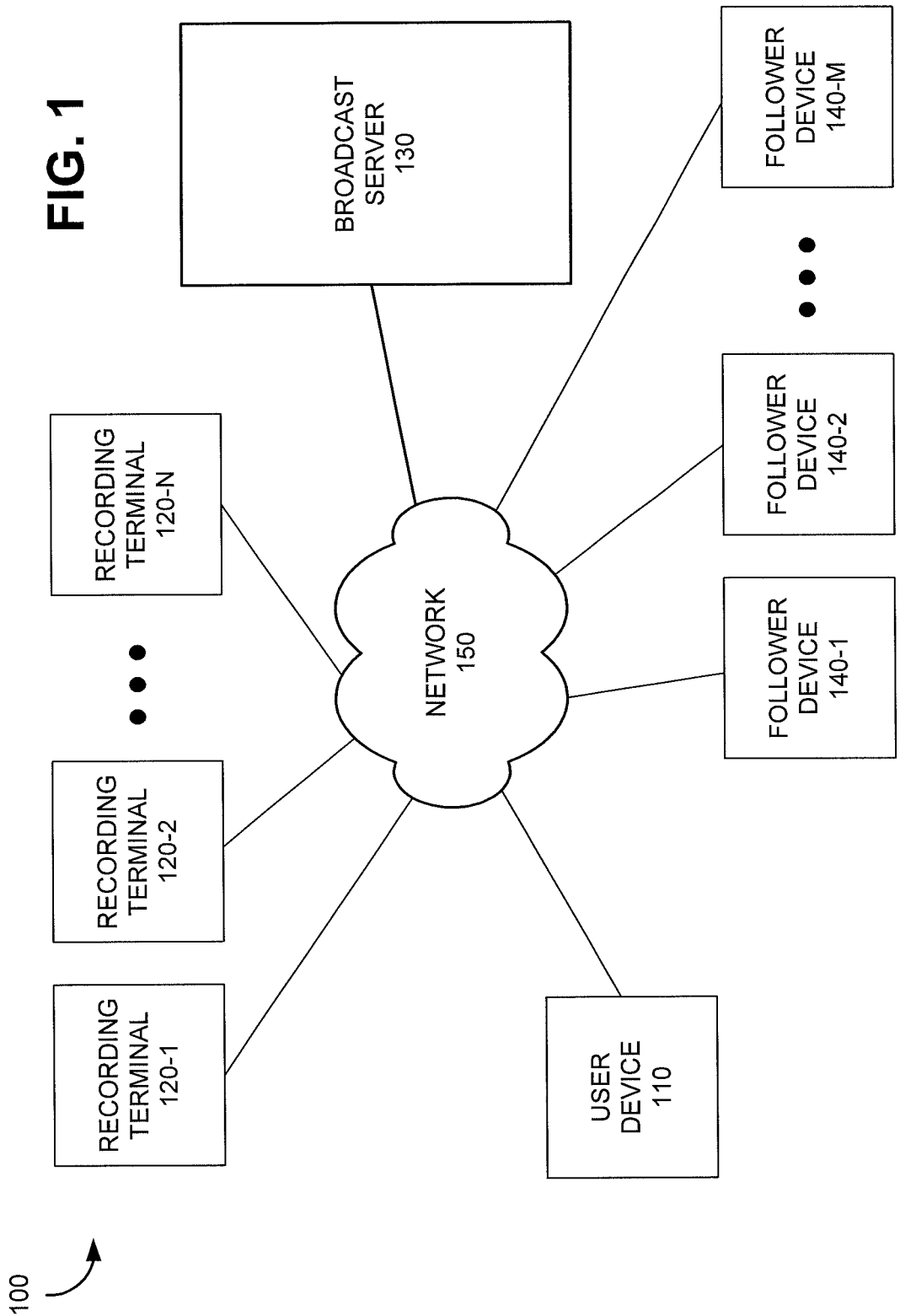
FIG. 1 is a diagram of an example environment in which systems and/or methods described herein may be implemented.

The following detailed description refers to the accompanying drawings. The same reference numbers in different drawings may identify the same or similar elements.

An implementation, described herein, may provide recording and broadcasting of content. The user may register for a service that may provide/manage broadcasts of content (e.g., video and audio content). The service may allow the user to select what recording devices (e.g., video cameras) may record when the user approaches the selected recording devices. The service may allow the user to create different lists for grouping potential followers (e.g., a user may create list 1 for co-workers, list 2 for family members, list 3 for friends, list 4 for restaurant lovers, etc.). The user may specify (i.e., set preferences regarding) which content (e.g., video recorded by camera 1, camera 5, or camera 12; video recorded after 3 p.m.; etc.) may be broadcast to which one or more lists of followers and how the content may be broadcast (e.g., pop-up a window to show a video on computer devices of the followers). The service may allow people to become followers of the user and/or join one or more of the lists. One of the selected recording devices may begin recording when the user approaches the selected recording device. The content being recorded by the selected recording device may be streamed to one or more followers of the user.

Additionally, as described herein, a service is described in which users can self-generate content, such as by taking pictures with the users' mobile phones (or other mobile devices). The pictures may be distributed to one or more designated "approval" users that approve or disapprove the pictures. The approved pictures may be incorporated into a display stream, such as a picture collage, that collectively represents the photographic experience of the users.

As used herein, the terms "user," "subscriber," "follower," and/or "viewer" may be used interchangeably. Also, the terms "user," "subscriber," "follower," and/or "viewer" are intended to be broadly interpreted to include a user device (e.g., a mobile communication device) or a user of a user device. The term "content" may refer to an image or video and/or audio content.

FIG. 1 is a diagram of an example environment 100 in which systems and/or methods described herein may be implemented. As illustrated, environment 100 may include one or more of the following components: a user device 110; recording terminals 120-1, 120-2, ..., 120-N (N≥1) (referred to herein collectively as "recording terminals 110" or generically as "recording terminal 110"); a broadcast server 130; follower devices 140-1, 140-2, ..., 140-M (M≥1) (referred to herein collectively as "follower devices 140" or generically as "follower device 140"); and a network 150. In practice, environment 100 may include additional components, fewer components, different components, or differently arranged components than are shown in FIG. 1. Also, components of environment 100 may interconnect via wired and/or wireless connections. In other words, any two components, of environment 100, may communicate via a wired connection, a wireless connection, or a combination of a wired connection and a wireless connection.

User device 110 may include any computation or communication device, such as a communication device that is capable of communicating (directly and/or via network 150) with recording terminals 120 and/or broadcast server 130. In one implementation, user device 110 may take the form of a smart phone, a personal digital assistant (PDA), a mobile telephone device, a laptop, a tablet, a television (TV), a handheld computer, a personal media player, etc. In another implementation, user device 110 may represent multiple devices operated by a user, including, for example, a personal computer and a mobile device. User device 110 may include one or more input components (e.g., a gyroscope, an accelerometer, a touch screen, a remote control device, a game controller, a keyboard, a keypad, a mouse, a microphone, etc.).

A user may use user device 110 to access a website provided by broadcast server 130.

In another implementation, user device 110 may host an application that communicates with broadcast server 130. The user may use user device 110 to register for/subscribe to a broadcast (social-networking) service provided by broadcast server 130. In one implementation, recording terminal 120 or user device 110 may determine a location of user device 110. User device 110 may transmit the location to broadcast server 130. In another implementation, recording terminal 120 may be notified that user device 110 is in close proximity via geographic notification. Geographic notification may allow for recording terminal 120 to be notified when user device 110 enters or leaves a specified geographic fence. The geographic fence may be based on a location (e.g., a geographic point (latitude &longitude)) of recording terminal 120 and a specified radius. In yet another implementation, user device 110 may include or represent an identifier (e.g., token, RFID tag, barcode, unique directory address, electronic serial number, international mobile equipment identifier, machine access control address, mobile directory number, mobile equipment identity, mobile identification numbers, device ID, OpenID, MAC address, etc.) corresponding to the user. Recording terminal 120 may determine an identity of the user of user device 110 based on the identifier. Alternatively, user device 110 may determine its presence in a coverage area corresponding to recording terminal 120 based on pre-loaded maps and information that indicates positions of recording terminals 120. User device 110 may establish communication with recording terminal 120 corresponding to the coverage area.

User device 110 may receive various notifications/information regarding recording terminals 120 located near (within a predefined distance of) user device 110; content associated with a user of user device 110 that is being recorded and/or broadcasted; followers of the user; etc. from broadcast server 130. User device 110 may transmit selections made by the user (by using one or more of the aforementioned input components of user device 110 and/or one or more user interfaces displayed by user device 110) regarding recording terminals 120, the content being recorded and/or broadcasted, and/or the followers of the user to broadcast server 130. The user may use user device 110 to view, select, and/or edit content received from broadcast server 130 and/or other sources (not shown in FIG. 1) (e.g., YouTube). User device 110 may transmit the content and/or instructions for broadcasting the content to broadcast server 130. User device 110 may also act as follower device 140. In another implementation, user device 110 may receive content directly from recording terminals 120 in the vicinity of user device (e.g., via Wi-Fi, Bluetooth etc.). Recording terminals 120 may provide the content to user device 110 after authentication of user device 110 by broadcast server 130 and/or a secure link is established by broadcast server 130.

Recording terminal 120 may include any device that is capable of recording/capturing content and communicating with broadcast server 130. In a particular geographic area, there may be a single recording terminal 120 or multiple recording terminals 120 that may cover the particular geographic area. Recording terminal 120 may include one or more recording devices (e.g., a camera, a video camera, etc.) and one or more input devices for detecting a user and/or user device 110, as further described below with reference to FIG. 2. For example, recording terminal 120 may determine that a user is within an area of recording terminal 120 (i.e., the user is within a range that may allow recording terminal 120 to record content involving the user). Recording terminal 120 may record content involving the user. Recording terminal 120 may receive instructions/commands related to the recording of the content (directly or indirectly) from user device 110 and/or broadcast server 130. Recording terminal 120 may adjust the recording of the content based on the instructions/commands. Recording terminal 120 may stream the content to broadcast server 130 via network 150. In another implementation, user device 110 may act as recording terminal 120 or a part of recording terminal 120. For example, user device 110 may receive audio for content and recording terminal 120 may receive video for the same content.

Broadcast server 130 may include any computation or communication device, such as a communication device that is capable of communicating (directly or via network 150) with user device 110, recording terminals 120, and/or follower devices 140. Broadcast server 130 may represent a single server device or a collection of multiple server devices and/or computer systems. Broadcast server 130 may allow a user of user device 110 to register for a broadcast service provided by broadcast server 130. Broadcast server 130 may receive requests from follower devices 140 to follow the user (i.e., receive broadcasts/content of the user). Broadcast server 130 may determine a geographic location of user device 110 by, for example, receiving the location from user device 110 or from one or more networks connected to user device 110. Broadcast server 130 may determine one or more recording terminals 120—that may record content involving the user at the geographic location. Broadcast server 130 may transmit information about the upcoming broadcast of the content to user device 110 and/or follower devices 140. Broadcast server 130 may receive instructions regarding the recording (e.g., choice of a camera, how to position a camera, etc.) and/or the upcoming broadcast (e.g., choice of one or more lists of followers to whom the content should be transmitted) from user device 110 and/or follower devices 140. Broadcast server 130 may transmit recording instructions to one or more of recording terminals 120. Broadcast server 130 may receive content from recording terminals 120. Broadcast server 130 may allow the user of user device 110 to edit the content. Broadcast server 130 may broadcast/transmit the content to follower devices 140.

Follower device 140 may include any computation or communication device, such as a communication device that is capable of communicating with broadcast server 130 via network 150. In one implementation, follower device 140 may take the form of a smart phone, a PDA, a mobile telephone device, a personal computer, a laptop, a tablet, a TV, a handheld computer, a personal media player, etc. In another implementation, follower device 140 may represent multiple devices operated by a single follower. A follower may use follower device 140 to access a website provided by broadcast server 130. The follower may use follower device 140 to register for/subscribe to a broadcast (social-networking) service provided by broadcast server 130. Follower device 140 may transmit information regarding which user(s) the follower wants to follow (i.e., broadcast content of which user(s) the follower wants to receive), preferences regarding the broadcasts, etc. to broadcast server 130. Follower device 140 may receive content and instructions for displaying the content from broadcast server 130. Follower device 140 may display the content on a screen of follower device 140 based on the instructions for displaying the content. Follower device 140 may also act as user device 110.

Network 150 may include a single network, multiple networks of a same type, or multiple networks of different types.

For example, network 150 may include one or more of a direct connection between devices, a local area network (LAN), a wide area network (WAN) (e.g., the Internet), a metropolitan area network (MAN), a wireless network (e.g., a general packet radio service (GPRS) network), a long term evolution (LTE) network), a telephone network (e.g., a Public Switched Telephone Network or a cellular network), a subset of the Internet, an ad hoc network, a fiber optic network (e.g., a fiber optic service (FiOS) network), or any combination of the aforementioned networks.

Figure 2:
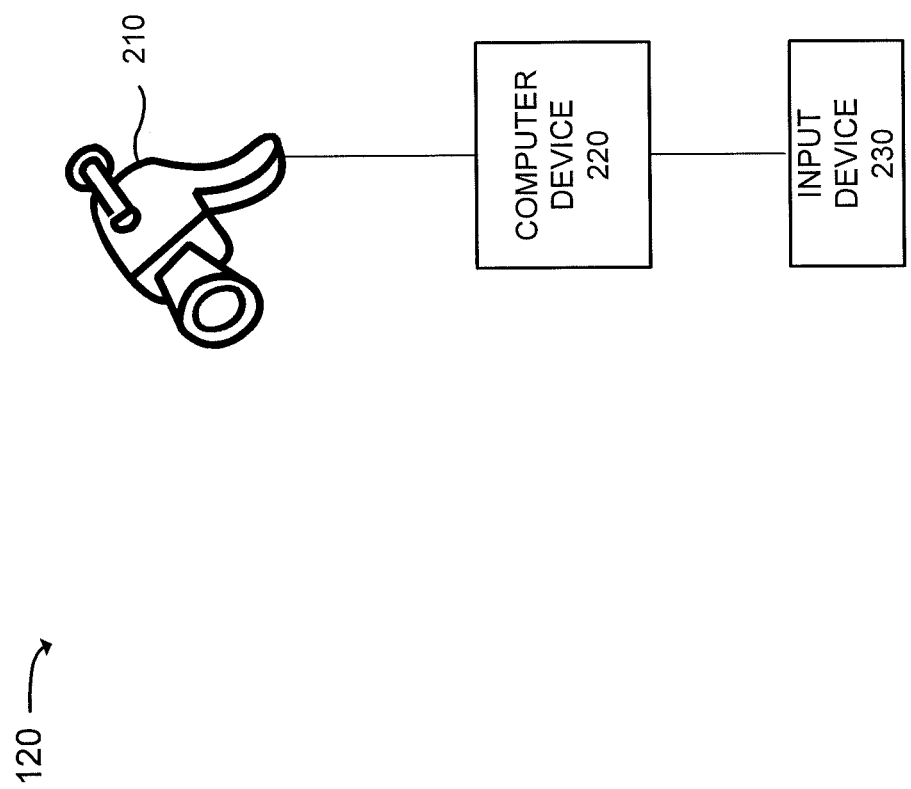
FIG. 2 is a diagram of example devices of a recording terminal of FIG. 1.

FIG. 2 is a diagram of example devices of recording terminal 120. Recording terminal 120 may include a recording device 210, a computer device 220, and an input device 230. In practice, recording terminal 120 may include additional devices, fewer devices, different devices, or differently arranged devices than are shown in FIG. 2. For example, recording terminal 120 may include multiple recording devices and/or multiple input devices. In a further example, multiple recording terminals 120 may be connected to one computer device 220. In another example, recording terminal 120 may not include a separate input device 230.

In some implementations, one or more of the devices of recording terminal 120 may perform one or more functions described as being performed by another one or more of the devices of recording terminal 120. Furthermore, two or more of the devices of recording terminal 120 may be implemented within a single device, or a single device may be implemented as multiple, distributed devices. For example, recording device 210, computer device 220, and/or input device 230 may be integrated into a single device that performs all or some of the functions described below as being performed by an individual one of these devices.

Devices of recording terminal 120 may interconnect via wired and/or wireless connections. In other words, any two devices, of recording terminal 120, may communicate via a wired connection, a wireless connection, or a combination of a wired connection and a wireless connection. In another implementation, two or more devices of recording terminal 120 may communicate via network 150.

Recording device 210 may include any device capable of recording/capturing content. Recording device 210 may represent multiple recording devices connected to computer device 220. Recording device 210 and computer device 220 may be part of a single device. Recording device 110 may take the form of a camera, a video camera, and/or an audio recorder. Recording device 210 may receive a command, from computer device 220, to begin recording. Recording device 210 may receive input video and/or audio content. Recording device 210 may adjust the input based on instructions (e.g., zoom in, zoom out, turn left, move up, etc.) received from computer device 220. Recording device 210 may generate content based on the input. Recording device 210 may transmit the generated content to computer device 220. Recording device 210 may receive a command to end the recording (i.e., the input) from computer device 220.

Computer device 220 may include any computation and/or communication device, such as a communication device that is capable of communicating with broadcast server 130 via network 150 and/or directly with recording device 210 and/or input device 230. For example, computer device 220 may take the form of a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a wireless device, a smart phone, a laptop computer (e.g., with a wireless air card), a server, etc.

Computer device 220 may receive user identity information (e.g., identifier of user device 110, biometric information of a user, etc.) from input device 210. Computer device 220 may transmit the user identity information to broadcast server 130. Computer device 220 may receive command(s) and/or instruction(s) for recording content from broadcast server 130 and/or input device 210. In one implementation, computer device 220 may transmit the command(s) and/or the instruction(s) to recording device 210. In another implementation, computer device 220 may control recording device 210 based on the command(s) and/or the instruction(s) by, for example, transmitting signals to recording device 210. Computer device 220 may receive content from recording device 210. Computer device 220 may transmit/stream the content to broadcast server 130 via network 150.

Input device 230 may include any device capable of transmitting information from a user and/or user device 110 to computer device 220. Input device 230 may represent multiple input devices. Input device 230 and computer device 220 may be part of a single device. Input device 230 may receive one type of information or multiple types of information. Input device 230 may include one or more sensors to receive signals, such as wireless signals (e.g., infrared, Wi-Fi, LTE, and/or Bluetooth) or signals transmitted over wires (e.g., over a universal serial bus (USB) interface or the like) from user device 110 and/or computer device 220. Input device 230 may also include one or more biometric devices.

In one implementation, input device 230 may receive user identity information from user device 110 or another identifier (e.g., token, RFID tag, barcode, etc.) associated with a user. In another implementation, input device 230 may take the form of one or more biometric devices. A biometric device may include a device (e.g., a camera, a laser scanner, a microphone, etc.) that may receive biometric information associated with a particular user (e.g., a retina scan, a voice signature, a facial signature, a fingerprint, etc.). The biometric information may serve as user identity information for a user. Input device 230 may also receive user identity information (e.g., user name and password, user id and password, pass code (e.g., digital ID), user drawn pattern, etc.) and/or commands entered by a user using user device 110, directly or indirectly (e.g., via network 150 and/or broadcast server 130) from user device 110. Input device 230 may transmit the user identity information and/or commands to computer device 220.

Figure 3:
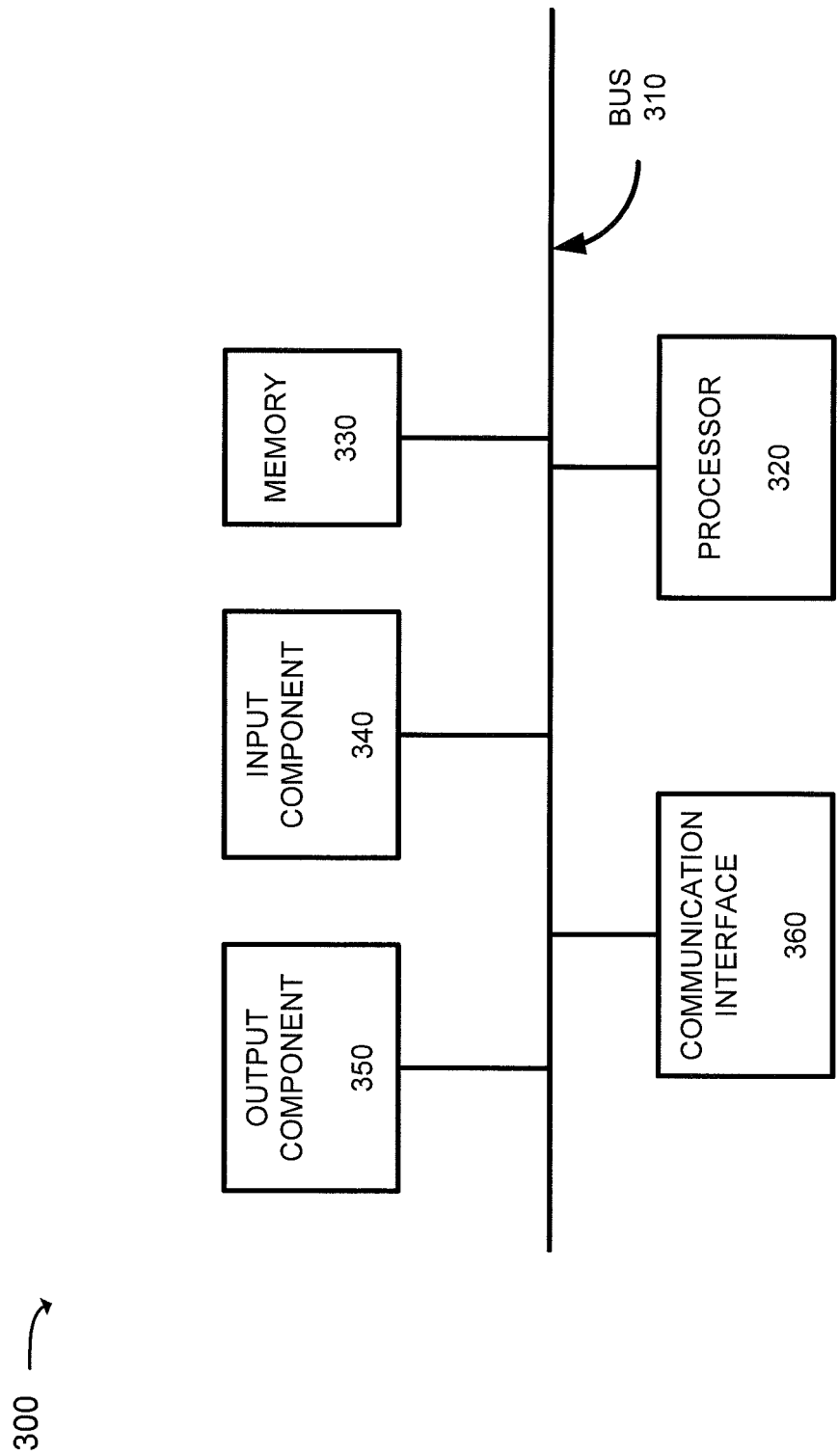
FIG. 3 is a diagram of example components of one or more of the devices of FIG. 1 and/or FIG. 2.

FIG. 3 is a diagram of example components of a device 300 that may be associated with user device 110, computer device 210, broadcast server 130, and/or follower device 140. Each of user device 110, computer device 210, broadcast server 130, and/or follower device 140 may include one or more devices 300 and/or one or more of each one of the components of device 300.

As shown in FIG. 3, device 300 may include a bus 310, a processor 320, a memory 330, an input component 340, an output component 350, and a communication interface 360. In another implementation, device 300 may include additional components, fewer components, different components, or differently arranged components than are shown in FIG. 3.

Bus 310 may include a path that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits a user to input information to device 300, such as a keyboard, a keypad, a button, a switch, a camera, a microphone, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communication interface 360 and transmit them over the air, and receive RF signals over the air and provide them to communication interface 360. In one implementation, for example, communication interface 360 may communicate with network 150 and/or devices connected to network 150.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.) or other forms of RAM or ROM. A computer-readable medium may be defined as a non-transitory memory device. A memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
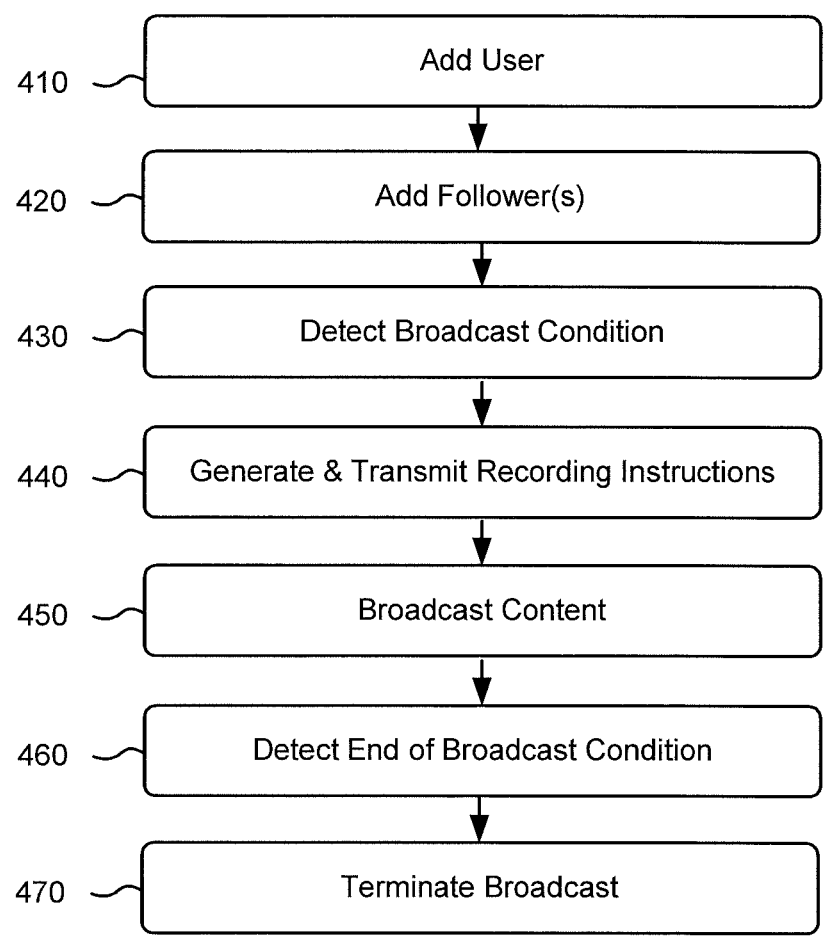
FIG. 4 is a flowchart of an example process for broadcasting content.

FIG. 4 is a flowchart of an example process 400 for broadcasting content. In one implementation, process 400 may be performed by broadcast server 130. In another implementation, some or all of process 400 may be performed by a device or collection of devices separate from, or in combination with, broadcast server 130.

As shown in FIG. 4, process 400 may include adding a user (block 410). For example, a user may decide to use a broadcast service provided by broadcast server 130. The user may use user device 110 to access a website provided by broadcast server 130. The user may enter user information (e.g., username, password, age, gender, address, etc.) and/or provide user identity information. The user identity information may include information that may be used to identify the user and/or user device 110 (e.g., mobile device of the user). The user identity information may include user device information of user device 110 (e.g., phone number corresponding to user device 110, RFID tag corresponding to user device 110, etc.) and/or biometric information of the user that may be used to identify the user. In one implementation, broadcast server 130 may provide an application to user device 110 and/or follower device 140 to allow a user and/or a follower to use the broadcast service on user device 110 and/or follower device 140.

Broadcast server 130 may provide one or more user interfaces to user device 130 for the user to select one or more recording terminals 120 and/or one or more recording devices 210 (herein, "recording terminals 120" may refer to recording devices 210) to record content involving the user when the user is within a range/an area of one of recording terminals 120. In one implementation, the user may select multiple recording terminals 120 corresponding to one or more geographic locations (represented by, for example, one or more of geographic coordinates, a geographic address, a name of a city, a description/name of a location etc. (e.g., Miami, Times Square in New York, White House, etc.)) and/or types of establishments (e.g., restaurants, fast food restaurants, office building, lobby, outdoor park, etc.). In another implementation, the user may select individual recording terminals 120 (e.g., the user may select camera 1, camera 547, camera 548, camera at the corner of $5^{th}$ St. and Main St., etc.). The user may, in order to select recording terminals 120, view a map showing different recording terminals 120 and/or use a search tool. The user may also request for broadcast server 130 to provide a preview of a view from one or more recording terminals 120 (e.g., a still image of a view from a viewpoint of camera 1, a live feed being recorded by camera 1, etc.). The user may also select all available recording terminals 120 and/or exclude recording terminals 120 individually and/or by specifying geographic locations, types of establishments (e.g., bathrooms), etc. User device 110 may transmit the information, related to selection(s) of recording terminals 120, to broadcast server 130. User device 110 may also store the information about selected recording terminals 120. At a later point in time, user device 110 may use the stored information about selected recording terminals 120 to provide the user with information about recording terminals 120 near the user.

Broadcast server 130 may provide one or more user interfaces to user device 110 for the user to specify additional recording preferences and/or broadcasting preferences. For example, the user may specify time different periods (e.g., September-November, 10:00 am-5:00 pm, Weekend, etc.) when content should be recorded by different recording terminals 120. The user may also specify how content should be recorded by specifying video quality, length of content, when to stop and start recording, required proximity of the user to the recording terminals 120, etc. The user may further instruct broadcast server 130 to transmit a notification to user device 110 and/or to receive a selection of a recording device (e.g., camera) from user device 110 before beginning recording of content. The user may also specify how content should be broadcast (e.g., pop-up a window on a screen of follower device 140 to display the content, receive permission to transmit the content to follower device 140 from follower device 140, store the content to be transmitted and/or accessed at a later point in time, etc.) and/or to whom different content should be broadcast. The user may also provide preferences related to who may access content that is saved by broadcast server 130, how the content may be accessed, and/or when (e.g., for how long) the content may be accessed. In other implementations, broadcast server 130 may allow a user to specify one or more of the preferences described above only after a person signs-up to be a follower of the user, as discussed further below. Broadcast server 130 may determine whether the follower has provided permission to allow the user to specify a preference (e.g., pop-up a window on a screen of follower device 140) in relation to the follower.

Broadcast server 130 may provide one or more user interfaces to user device 130 for the user to create lists for different groups of followers and/or to specify different criteria for a person to become a follower and/or join one of the lists. The user may also specify what type of content each one of the lists should receive. For example, the user may create list 1 for followers who are co-workers of the user, list 2 for followers who are family members of the user, and list 3 for followers who are friends of the user. The user may specify that only people who identify the same employer as the user, in their profiles (e.g., of a social network) and/or as user information, may become followers and join list 1. The user may further specify that followers who are grouped in list 1 may receive content recorded by, for example, recording terminals 120 in conference rooms of office buildings in Atlanta between 10:00 a.m.-5:00 p.m. on Monday-Friday. The user may also specify that broadcast server 130 may need to receive confirmation from user device 110 and/or follower device 140 before transmitting the content to the followers included (i.e., to follower device 140) in list 1.

For list 2, the user may specify that only people who have the same last name as the user may join list 2 as followers; that followers in list 2 may only receive content recorded by recording terminal 120-1 (e.g., camera 1) and recording terminal 120-9 (e.g., camera 9) between 6:00-10:00 p.m.; that the content provided to follower devices 140 should not exceed 15 seconds at one time; and that a window should pop-up to display the content on follower devices 140 when follower devices 140 receive the content from broadcast server 130. For list 3, the user may specify that only people expressly invited to join list 3 may join list 3 as followers. The user may use user device 110 to provide/enter names/identifiers of people who may join list 3 as followers. In another implementation, the user may use contacts in one or more existing contact lists or social network(s) to select people who may join list 3 as followers. The user may further specify that the followers of list 3 may receive content recorded by recording terminals 120 located outside of Georgia; that the content may be broadcast to follower device 140 only when broadcast server 130 receives a request for the content from follower device 140; and/or that broadcast server 130 may need to notify user device 110 regarding what follower devices 140 receive the content.

User device 110 may transmit the user information, the user identity information, the selections of recording terminals 120, the recording preferences, the broadcasting preferences, and/or information related to the created lists to broadcasting server 130. Broadcast server 130 may store the aforementioned information/preferences as part of a profile for the user in an internal and/or external storage device. Broadcast server 130 may add the user as a user of the broadcasting service by creating/storing the profile of the user. The user may use user device 110 to access a website provided by broadcast server 130 to modify information saved in the profile of the user (e.g., select new recording terminals 120, delete a list, set new preferences, etc.).

As further shown in FIG. 4, follower(s) may be added (block 420). For example, a follower may use follower device 140 and/or another computing device to access a website provided by broadcast server 130. The follower may be required to enter follower information (e.g., user identifier, username, name, address, etc.) and/or device information (e.g., contact information of follower device 140, type (e.g., Blackberry Tour, Apple iPad) of follower device 140, etc.) to be added as a follower of one or more users. In another implementation, broadcast server 130 may determine device type and device capabilities of follower device 140. The follower information and/or device information may be transmitted to broadcast server 130. In one implementation, broadcast server 130 may identify the follower based on the follower information when a user previously provided information to identify the follower in order to allow the follower to become a follower of the user and/or to allow the follower to join one or more lists created by the user. In another implementation, broadcast server 130 may provide one or more user interfaces for the follower to search for different users who are broadcasting content by using the broadcasting service. The follower may select which one or more users to follow and/or what list(s) corresponding to each user to join. Broadcast server 130 may determine whether the follower is allowed to follow the users (e.g., a user might require an invitation from the user to a person for the person to become a follower of the user) and join the list(s). In yet another implementation, broadcast server 130 may transmit an add request to user device 110 in order to request a user to provide permission to add a person as a follower of a user of user device 110. Broadcast server 130 may add the follower to one or more lists of one or more users.

In other implementations, broadcast server 130 may provide one or more user interfaces for the follower to provide preferences for receiving content. Follower device 140 may display the user interfaces and receive input from the follower. For example, a follower may elect to receive only content, involving one or more users, recorded by one or more recording terminals 120 and/or one or more recording devices 210. The follower may specify to receive content recorded only in one or more different time periods and/or receive the recorded content at one or more specified times. Furthermore, the follower may specify how she wants to receive the recorded content (e.g., pop-up a window on a screen of follower device 140 to display the content while the content is being recorded; notify the follower about the content being recorded via email, text message, and/or alert in a dedicated (broadcast service) application and allow the follower to select a recording device 210 to continue recording the content; allow the follower to retrieve the recorded content after the content is recorded; etc.). The follower may provide different preferences for different users that the follower is following and/or for different lists that the follower has joined.

Follower device 140 may transmit the preferences to broadcast server 130. Broadcast server 130 may determine whether the preferences are allowed for a follower of a user and/or a follower in a list (i.e., whether the preferences specified by the follower conflict with preferences specified by a user). Broadcast server 130 may notify the follower to modify preferences when the preferences set by the follower are not allowed. After the follower provides preferences that are allowed, the follower may be added as a follower of one or more users and/or included in one or more lists of the one or more users.

In another implementation, the user and/or the follower may be offered to use the broadcast service while browsing another social networking website. A registration process for the broadcast service may be integrated into the social networking website (e.g., the user may invite followers (for a list) from existing contacts in the social network). A member of the social network may only need to provide additional information necessary to be a user of the broadcast service, and not already stored by the social network for the member. Multiple social networks may provide access to the broadcast service for the same user(s) and/or followers. A single user/follower may broadcast, receive, and/or view content via the broadcast service by using one or more social networks.

As also shown in FIG. 4, a broadcast condition may be detected (block 430). For example, as discussed above, a user may specify one or more broadcast conditions. A broadcast condition may indicate when content associated with the user may be recorded and/or broadcasted to followers of the user. For example, a user may specify that a broadcast condition may be met/occur when the user is within a geographic area associated with recording terminal 120-3. The user, with user device 110, may walk into the area. In one implementation, user device 110 may transmit information identifying a location (e.g., geographic coordinates) of user device 110 to broadcast server 130. In other implementations, broadcast server 130 may provide an application to user device 110 for a broadcasting service. The application may transmit to broadcast server 130 a geographic notification when user device 110 is within a predefined distance/radius of one of recording terminals 120. Broadcast server 130 may determine (e.g., after receiving information identifying the location of user device 110 or the geographic notification) that the broadcast condition is met for the user because user device 110 is within the geographic area of recording terminal 120-3 (i.e., the location of user device 110 is within the geographic area). In another implementation, input device 230 of recording terminal 120-3 may receive user identity information in a form of an identifier of user device 110, biometric information (e.g., a facial image/signature) of a user, and/or information entered by the user. Computer device 220 of recording terminal 120-3 may transmit the user identity information to broadcast server 130. Broadcast server 130 may determine that the broadcast condition is met for the user because the user identity information corresponds to the user and the user is within the geographic area of recording terminal 120-3. In other implementations, the user may set additional broadcast conditions (including, for example, a broadcast condition that may be met when broadcast server 130 receives a broadcast command and/or content from user device 110, etc.).

Recording instructions may be generated and transmitted (block 440). In one implementation, after detecting that a broadcast condition is met for a user, broadcast server 130 may generate recording instructions based on recording preferences and/or broadcasting preferences (and/or recording instructions/commands provided by the user, as further described below). For example, the recording instructions may indicate which one or more recording devices 210 of recording terminal 120-3 should record content involving the user or provide information about how to determine one or more recording devices 210 of recording terminal 120-3 that should record the content (e.g., choose a camera by using facial recognition to determine what camera(s) have the best view of the user based on a facial signature of the user). The recording instructions may also include other information about how the content should be recorded (e.g., period of time for the recording, position of recording device 210, etc.) and/or transmitted to broadcast server 130 (e.g., stream the content to broadcast server 130 during the recording, etc.). Broadcast server 130 may transmit the recording instructions to computer device 220 of recording terminal 120-3.

In another implementation, after detecting that a broadcast condition is met, broadcast server 130 may transmit a notification that the broadcast condition is met to user device 110. For example, the notification may include information about a broadcast condition that is met; information about recording terminal 120-3; information about recording devices 210 of recording terminal 120-3 that are available to record a user (including, for example, locations and previews of views from the different recording devices (e.g., via a live feed, a still image, etc. from recording device 210)); information about follower(s) that may receive content recorded by recording terminal 120-3; etc. A user may use user device 110 to provide recording instructions (e.g., selection of one or more recording devices 210, position and degree of zoom of the one or more recording devices 210, length of content to be recorded, followers and/or lists that should receive the content, etc.). User device 110 may transmit the recording instructions directly to recording terminal 120-3 and/or via broadcast server 130.

Content may be broadcasted (block 450). For example, broadcast server 130 may receive content, involving a user, from recording terminal 120. Broadcast server 130 may identify which followers, of the user, should receive the content. Broadcast server 130 may continuously receive the content from recording terminal 120. In one implementation, broadcast server 130 may continuously stream the content to follower devices 140 of the identified followers and/or user device 110 of the user after receiving the content. In another implementation, before streaming the content to follower devices 140 of the identified followers, broadcast server 130 may transmit an image of the user and/or clip of the content to follower devices 140 of the identified followers. Follower device 140 may receive the image and/or clip of the content with a request to provide permission to stream the content of the user to follower device 140. A follower, of follower device 140, may use follower device 140 to provide permission for broadcast server 130 to stream/transmit the content to follower device 140 at a present time or at a later point in time. One or more of follower devices 140 may transmit permissions to receive the content to broadcast server 130. Broadcast server 130 may stream/transmit content to follower devices 140 that provided permissions for broadcast server 130 to stream/transmit the content based on the permissions. Follower devices 140 may receive the content along with instructions for displaying the content based on preferences set by the user and/or the follower(s). For example, the instructions may specify to pop-up a window on a screen of follower device 140 to display the content.

In another implementation, a user of user device 110 may allow only part of content recorded by recording terminals 120 to be broadcasted. The user may also use user device 110 device as a recording terminals 120 to record audio and/or video content. The user may allow to continuously broadcast one type of content from recording terminal 120 while adjusting what types of content, if any, may be broadcasted by other recording terminals 120. For example, the user may allow audio recorded by user device 110 to be broadcasted continuously (all the time), "mute" audio from all other recording terminals 120, and adjust, as the user moves around, what video recording devices of recording terminals 120 may record video involving the user. Broadcast server 130 may receive and aggregate audio and video content from different recording terminals 120. Broadcast server 130 may broadcast the aggregated content to follower devices 140.

Meanwhile, during the streaming of the content to follower devices 140, broadcast server 130 and/or input device 230 may receive a command from user device 110 and/or follower devices 140. For example, a user may use an input component of user device 110 to transmit command(s) to move recording device 210 while continuing to record the content. User device 110 may transmit the commands to broadcast server 130. Broadcast server 130 may generate new recording instructions based on the commands. Broadcast server 130 may transmit the new recording instructions to recording terminals 120.

During the broadcasting of the content, broadcast server 130 may transmit a broadcast message to user device 110 that describes which follower devices 140 are receiving the content and/or which followers are using follower devices 140 to view the content. The broadcast message may include a number representing how many follower devices 140 are receiving the content and/or identifiers of followers corresponding to follower devices 140. A user of user device 110 may provide privacy instructions to terminate broadcast of the content being transmitted (or to permanently end one or more broadcasts) to one or more follower devices 140. User device 110 may transmit the privacy instructions in a form of an exclusion message to broadcast server 130. The exclusion message may include identifiers of followers and/or follower devices 140 which the user does not want to receive the content. Broadcast server 130 may stop broadcasting the content to one or more follower devices 140 (and/or update one or more lists of the user) based on the exclusion message.

During the broadcasting of the content, broadcast server 130 may receive viewing instructions from follower devices 140. For example, a follower, associated with follower device 140-1, may follow multiple users. Broadcast server 130 may receive different content, involving the multiple users, from multiple recording terminals 120. Broadcast server 130 may transmit information about the different content to follower device 140-1. The follower may use follower device 140-1 to provide viewing instructions to broadcast server 130. For example, the viewing instructions may specify a request to view all of the content being received for the multiple users at the same time (e.g., in different windows), to view content corresponding to one of the users at a present time and to view the other content at a later point in time, to view the content individually and sequentially, etc. Broadcast server 130 may transmit the different content to follower device 140-1 based on the viewing instructions.

As also show in FIG. 4, an end of a broadcast condition may be detected (block 460). For example, content, involving a user, may be broadcasted after detecting a broadcast condition of the user being located within a geographic area of recording terminal 120-3. The user may leave the area. In one implementation, user device 110 may transmit an updated location of user device 110 to broadcast server 130. Broadcast server 130 may determine that user device 110 is no longer located within the geographic area of recording terminal 120-3. In a further implementation, input device 230 of recording terminal 120-3 may determine that the user is no longer located within the geographic area of recording terminal 120-3. Accordingly, recording terminal 120-3 may notify the broadcast server 130 that the user is no longer located within the geographic area of recording terminal 120-3. As a result, broadcast server 130 may determine an end of the broadcast condition that prompted the recording of the content by recording terminal 120-3 and the broadcasting of the content. In another implementation, the user may use user device 110 to transmit termination instructions to end recording of the content by recording terminal 120-3. Broadcast server 130 may detect an end of a broadcast condition based on the termination instructions. In yet another implementation, broadcast server 130 may detect the end of the broadcast condition after a predefined period of time defined as part of preferences of the user.

A broadcast may be terminated (block 470). After determining an end of a broadcast condition, broadcast server 130 may transmit instructions to recording terminal 120 for recording terminal 120 to stop recording content. Broadcast server 130 may further transmit information to user device 110 about the end of the broadcast condition. Broadcast server 130 may also transmit the rest of the content recorded by recording terminal 120 to follower devices 140 and a notification regarding the termination of the broadcast. Alternatively, broadcast server 130 may not transmit any more content even if broadcast server 130 has more content to send.

Figure 5:
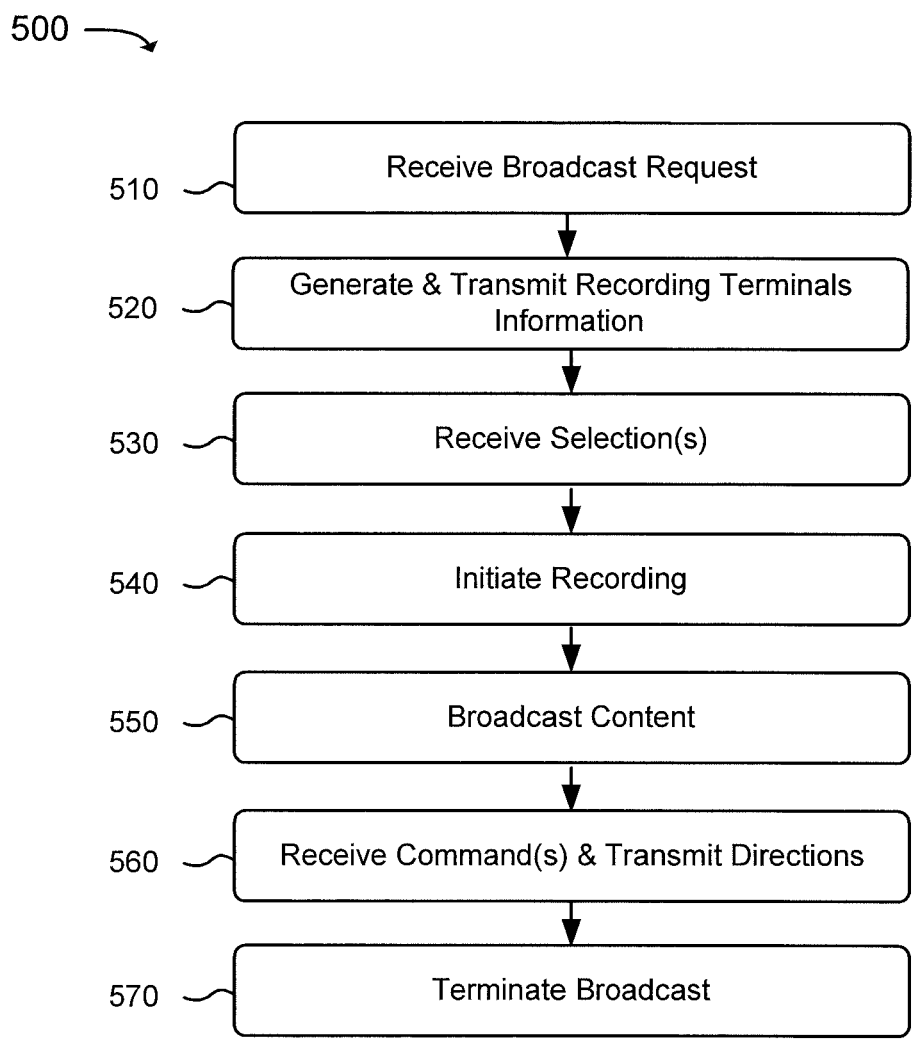
FIG. 5 is a flowchart of an example process for providing user-initiated broadcast of content.

FIG. 5 is a flowchart of an example process 500 for providing user-initiated broadcast of content. In one implementation, process 500 may be performed by broadcast server 130. In another implementation, some or all of process 500 may be performed by a device or collection of devices separate from, or in combination with, broadcast server 130.

As shown in FIG. 5, process 500 may include receiving a broadcast request (block 510). For example, a user may arrive at a geographic location. The user may use user device 110 to transmit a broadcast request to broadcast server 130. The broadcast request may include a request for information about recording terminals 120 near the geographic location. Broadcast server 130 may receive the broadcast request from user device 110.

Recording terminals information may be generated and transmitted (block 520). For example, broadcast server 130 may determine a geographic location of user device 110 based on a broadcast request received from user device 110. Thereafter, broadcast server 130 may identify recording terminals 120 that are located near the geographic location within a predefined distance and/or distances specified in the broadcast request. Broadcast server 130 may further narrow a list of identified recording terminals 120 based on preferences of a user of user device 110. Broadcast server 130 may generate recording terminals information to provide information about recording terminals 120 on the list.

In one implementation, the recording terminals information may include descriptions of locations (e.g., NW corner of the Stressed Salon, 2111 Franklin St., New York, N.Y.) of recording terminals 120 on the list and/or distances (e.g., 250 yards/meters) from recording terminals 120 on the list to the geographic location of user device 110. In another implementation, broadcast server 130 may generate a representation (e.g., a static map and/or an interactive map) that illustrates the locations of recording terminals 120 on the list in relation to the location of user device 110. For example, different symbols on the representation may represent the locations of recording terminals 120 and/or user device 110. A representation in a form of an interactive map may display the movement of user device 110 towards and/or away from the locations of recording terminals 120. The interactive map may also allow the user, of user device 110, to access additional information about each recording terminal 120 represented on the map. The additional information may include a name of an establishment housing recording terminal 120 (e.g., Bryant Park, Stressed Salon, etc.), a description of recording devices 210 corresponding to recording terminal 120, a preview of views of recording devices 210 corresponding to recording terminal 120, etc. Broadcast server 130 may transmit the recording terminals information to user device 110.

As further shown in FIG. 5, selections may be received (block 530). For example, user device 110 may receive recording terminals information in a form of an interactive map from broadcast server 130. A user, of user device 110, may proceed to move to an area corresponding to recording terminal 120 that is shown on the interactive map. The user may use user device 110 to select recording terminal 120 after arriving at the area. User device 110 may transmit the selection of recording terminal 120 to broadcast server 130. In another implementation, broadcast server 130 may determine recording devices 210 corresponding to recording terminal 120. Broadcast server 130 may transmit live feeds and/or still images corresponding to the recording devices 210 to user device 110. The user may use user device 110 to select recording devices 210 to record content involving the user. User device 110 may transmit the selection of recording devices 210 to broadcast server 130.

Recording may be initiated (block 540). For example, broadcast server 130 may receive selection(s) of one or more recording terminals 120 and/or recording devices 210 from user device 110. Broadcast server 130 may generate recording instructions for recording content involving the user based on the selection(s) and/or preferences of a user of user device 210. Broadcast server 130 may transmit the recording instructions to recording terminal 120. Computer device 220, of recording terminal 120, may receive the recording instructions. Computer device 220 may operate one or more recording devices 210 to record content based on the recording instructions.

Content may be broadcasted (block 550). For example, recording terminal 120 may transmit recorded content to broadcast server 130. Broadcast server 130 may determine which follower devices 140, corresponding to followers of a user, should receive the content. Broadcast server 130 may transmit information about the content being recorded to follower devices 140. Broadcast server 130 may receive different instructions from different follower devices 140 (e.g., provide the content to display now, provide the content at a later point in time, provide the content along with other content being received by broadcast server 130, etc.). Broadcast server 130 may transmit the content to follower devices 140 based on the instructions.

Commands may be received and directions may be transmitted (block 560). For example, broadcast server 130 may also transmit content received from recording terminal 120 to user device 110. A user, of user device 110, may use input components to provide commands regarding how recording terminal 120 should continue to record the content. The commands may include, for example, commands to use a different recording terminal 120 and/or recording device 210, commands to change the position of recording device(s) 210, commands to zoom-in and/or zoom-out, etc. In one implementation, user device 110 may transmit the commands to broadcast server 130. Broadcast server 130 may generate new recording instructions based on the commands. Broadcast server 130 may transmit the new recording instructions to recording terminal 120. Recording terminal 120 may adjust the recording of the content (e.g., rotate recording device 210, zoom-in, etc.) based on the new recording instructions. In another implementation, user device 110 may transmit the commands directly to input device 230 of recording terminal 120. Computer device 220, of recording terminal 120, may adjust the recording of the content based on the commands. In both implementations, recording terminal 120 may continue to transmit the recorded content to broadcast server 130.

A broadcast may be terminated (block 570). In one implementation, recording terminal 120 may determine that a user left a geographic area corresponding to recording terminal 120. For example, input device 220 of recording terminal 120 may continuously (or periodically) receive user identity information (e.g., a signal corresponding to an identifier of user device 110, biometric information of a user, etc.) during the recording and the broadcasting of content involving the user. Thereafter, recording terminal 120 may determine that input device 220 stopped receiving the user identity information. As a result, recording terminal 120 and/or broadcast server 130 may determine that the user left the geographic area corresponding to recording terminal 120. In response, recording terminal 120 may stop recording the content involving the user. Broadcast server 130 may send a message to user device 110 to indicate that the broadcast of the content recorded by recording terminal 120 was terminated because the user left the geographic area corresponding to recording terminal 120. The user may use user device 110 to transmit a new broadcast request to broadcast server 130 (block 510). The user may use user device 110 to provide new instructions/commands to record and/or broadcast new content not involving the user to broadcast server 130. For example, the user may provide commands for recording terminal 120 to continue recording new content even though the user might not be in an area corresponding to recording terminal 120 and for broadcasting server to receive and broadcast the new content.

In other implementations, a broadcast may be terminated by a user using user device 110 to provide directions for recording terminal 120 to stop recording content involving the user, by a broadcast server 130 transmitting instructions for recording terminal 120 to stop recording content after a predefined period based on preferences of the user, etc. Broadcast server 130 may terminate the broadcast after broadcast server 130 stops receiving newly recorded content for the broadcast from recording terminal 120.

A user may use a broadcasting service provided by broadcast server 130 to broadcast previously recorded content. For example, user device 110 may transmit previously recorded content (and/or an identifier corresponding to the previously recorded content) with broadcasting instructions to broadcast server 130. Broadcast server 130 may (retrieve the previously recorded content and) determine whether a broadcast of the previously recorded content is permitted (e.g., determine whether the previously recorded content is copyrighted, etc.). Broadcast server 130 may broadcast the previously recorded content based on the broadcasting instructions to one or more follower devices 140.

A user may also edit and/or tag content recorded by recording terminals 120. For example, broadcast server 130 may forward content from recording terminal 120 to user device 110 before broadcasting the content to follower devices 140. The user may use an application, provided by broadcast server 130 to user device 110, to modify the content (e.g., identify a celebrity by tagging an image of a celebrity included in the content; add descriptions of activities occurring in the content; etc.). User device 110 may transmit the modified content to broadcast server 130. Broadcast server 130 may broadcast the modified content to followers of the user by transmitting the modified content to follower devices 140. In another implementation, the content may also be automatically tagged (with, for example, a location of recording terminal 120), by broadcast server 130.

Figure 6:
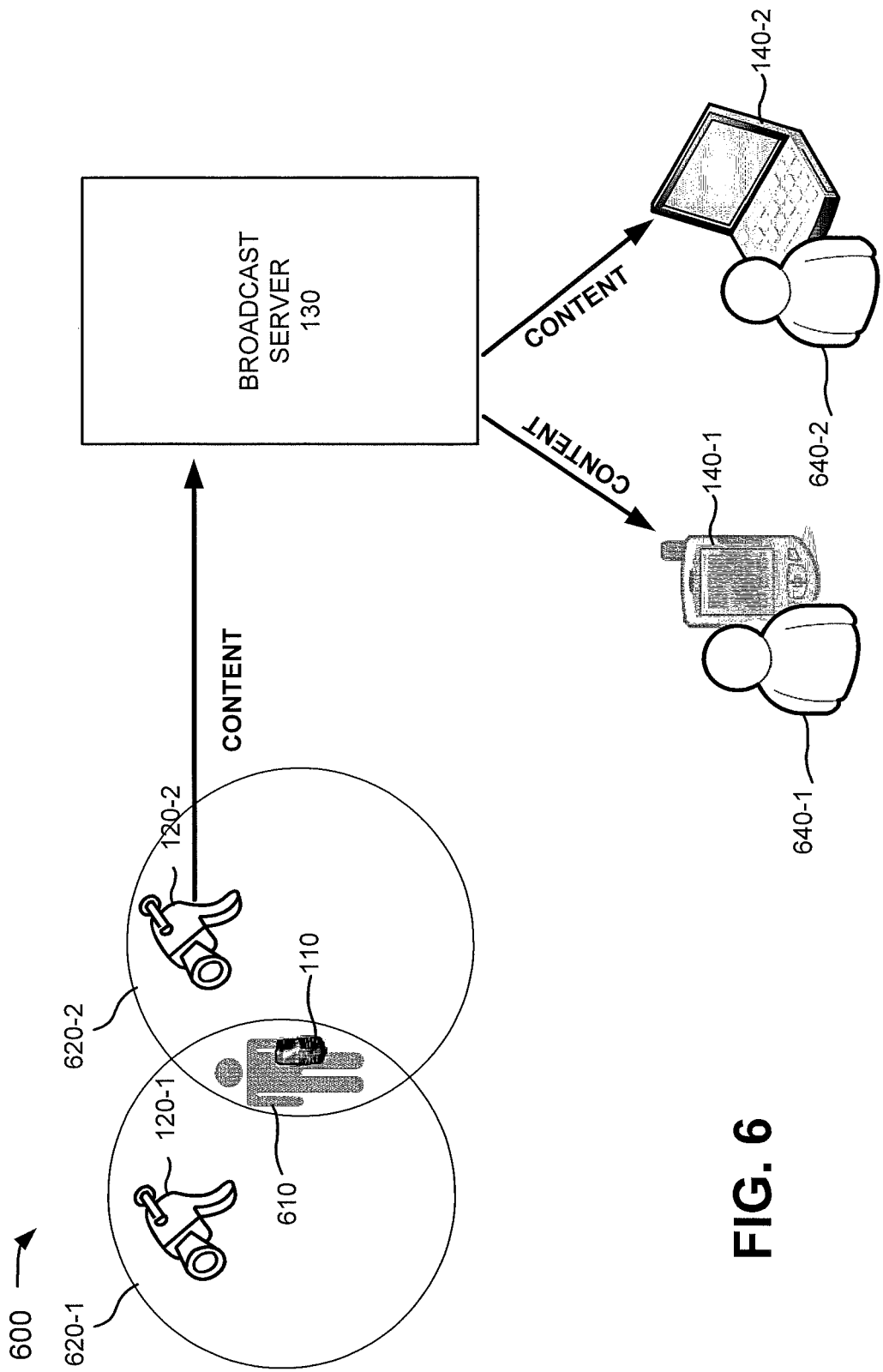
FIG. 6 is a diagram that illustrates an example of broadcasting content.

FIG. 6 is a diagram that illustrates an example 600 of broadcasting content. A user 610 may use user device 110 or another computing device to register for a broadcasting service, provided by broadcast server 130, in order to broadcast content to followers. A follower 640-1 may use follower device 140-1 and a follower 640-2 may use follower device 140-2 to sign-up as followers of the user, with respect to the broadcasting service, in order to receive content of user 610 from broadcast server 130. Follower 640-1 may provide complete permission for user 610 to control how and/or when content of user 610 is received by follower device 140-1. User 610 may set preferences for a window to pop-up, on a screen of follower device 140-1, to display the content as soon as follower device 140-1 receives the content. Follower 640-2 may provide limited permissions for user 610 to determine how and/or when content of user 610 is received by follower device 140-2. For example, follower 640-2 may restrict the content of user 610 from being transmitted to follower device 140-2 until follower 640-2 retrieves the content from broadcast server 130 and/or follower 640-2 provides explicit permission to receive the content. Each one of follower 640-1 and follower 640-2 may also register as a user in order to broadcast content via the broadcasting service. User 610 may sign-up as a follower of follower 640-1 and/or follower 640-2.

Assume that user 610 proceeds to move to a location (e.g., a middle of a restaurant) that is in an area 620-1 and an area 620-2 at 1:00 p.m. on Friday. Area 620-1 may correspond to an area covered by recording terminal 120-1 (e.g., a camera). Recording terminal 120-1 may record (e.g., generate video and audio content based on) activity within area 620-1. Area 620-2 may correspond to an area covered by recording terminal 120-2 (e.g., a camera). Recording terminal 120-2 may record (e.g., generate video and audio content based on) activity within area 620-2.

In one implementation, user device 110 may transmit location information (e.g., geographical coordinates of the location) to broadcast server 130. Broadcast server 130 may determine that user 610 is in area 620-1 and area 620-2 based on the location information. Broadcast server 130 may identify recording terminal 120-1 for area 620-1 and recording terminal 120-2 for area 620-2. Broadcast server 130 may retrieve and create a first live feed for recording terminal 120-1 and a second live feed for recording terminal 120-2. Broadcast server 130 may transmit information about available recording terminals to user device 110. The information about available recording terminals may include a map showing a position of recording terminal 120-1 and a position of recording terminal 120-2 in relation to the location of user device 110. The information about available recording terminals may also include the first live feed and the second live feed. Assume user 610 selects, using user device 110, recording terminal 120-2 to record content involving user 610. User device 110 may transmit the selection to broadcast server 130. Broadcast server 130 may transmit recording instructions to recording terminal 120-2 in response to the selection and based on preferences of user 610.

In another implementation, recording terminal 120-1 may capture and transmit a first facial image of user 610 and/or recording terminal 120-2 may capture and transmit a second facial image of user 610. Broadcast server 130 may receive the first facial image and the second facial image of user 610. Broadcast server 130 may identify user 610 by comparing the first facial image and/or the second facial image to a facial signature saved for the user. Broadcast server 130 may also determine that, for example, recording terminal 120-2 may record better content involving user 610 by comparing the first facial image and the second facial image to the facial signature and determining that the second facial image is a better match to the facial signature (when, for example, user 610 is closer to recording terminal 120-2 than recording terminal 120-1). As a result, broadcast server 130 may transmit recording instructions to recording terminal 120-2 in response to the determination and based on preferences of user 610.

Recording terminal 120-2 may receive the recording instructions from broadcast server 130, and record content based on the recording instructions. Recording terminal 120-2 may also receive commands (e.g., zoom-in), entered by user 610 using user device 110, directly from user device 110 and/or via broadcast server 130. Recording terminal 120-2 may modify the recording of the content based on the commands. Recording terminal 120-2 may transmit the recorded content to broadcast server 130. Broadcast server 130 may receive the content.

Broadcast server 130 may proceed to identify followers of user 610 who may receive and/or access content recorded by recording terminal 120-2 in the middle of the restaurant at 1:00 p.m. on Friday. Broadcast server 130 may identify follower 640-1 and follower 640-2. Broadcast server 130 may transmit the content and display instructions (e.g., pop-up a window to display the content) to follower device 140-1 based on preferences of user 610 and preferences of follower 640-1. Follower device 140-1 may receive the content, pop-up the window to display the content, and signal (e.g., vibrate, ring, etc.) that the content is received. Follower 640-1 may view the content on the screen of follower device 140-1. Follower 640-2 may use follower device 140-2 to determine whether new content has been received by broadcast server 130 for user 610. Follower 640-2 may use follower device 140-2 to retrieve the content from broadcast server 130 by transmitting a request to broadcast server 130. Follower device 140-2 may receive the content from broadcast server 130 in response to the request and display the content on a screen of follower device 140-2. Follower 640-2 may view the content on the screen of follower device 140-2.

Assume that user 610 moves to a new location outside of area 620-2. In one implementation, user device 110 may transmit information regarding the new location to broadcast server 130. Broadcast server 130 may determine that user 610 moved outside of area 620-2 and, accordingly, transmit an end recording instruction to recording terminal 120-2 to stop recording content for user 610. In another implementation, recording terminal 120-2 may determine that user 610 is no longer within area 620-2, via its own input device 230, and stop recording content for user 610. Broadcast server 130 may also send a notification to user device 110 to notify user 610 that recording terminal 120-2 stopped/will stop recording content involving user 610 because user 610 moved outside of area 620-2.

An additional embodiment relating to a broadcasting service will next be described with reference to FIGS. 7-13. In general, as described below, user terminals (such as mobile phones with camera and/or video functionality), may be used to take images by broadcast participants. The images may be approved by designated administrators ("approval" users) and incorporated into an image display stream. Although the description below is described with reference to users taking pictures, video or audio content could additionally or alternatively be used.

Figure 7:
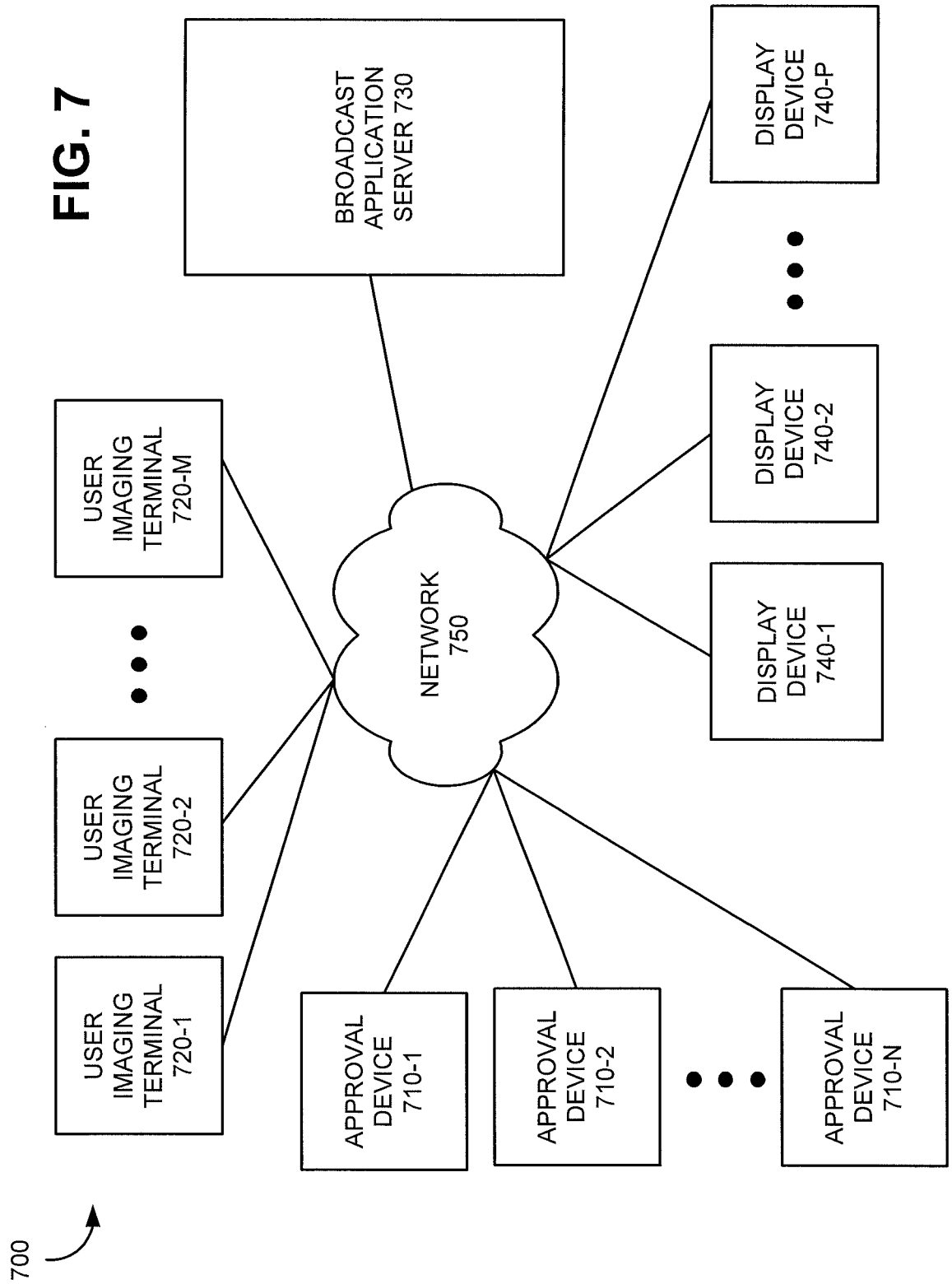
FIG. 7 is a diagram of another example environment in which systems and/or methods described herein may be implemented.

FIG. 7 is a diagram of another example environment 700 in which systems and/or methods described herein may be implemented. As illustrated, environment 700 may include one or more of the following components: approval devices 710-1 through 710-N (N≥1) (referred to herein collectively as "approval devices 710" or generically as "approval device 710"); user imaging terminals 720-1 through 720-M (M≥1) (referred to herein collectively as "user imaging terminals 720" or generically as "user imaging terminal 720"); a broadcast application server 730; display devices 740-1 through 740-P (P≥1) (referred to herein collectively as "display devices 740" or generically as "display device 740"); and a network 750. Components of environment 700 may interconnect via wired and/or wireless connections. In other words, any two components, of environment 700, may communicate via a wired connection, a wireless connection, or a combination of a wired connection and a wireless connection.

Approval devices 710 may include any computation or communication device, such as a communication device that is capable of communicating (directly and/or via network 750) with broadcast application server 730. In one implementation, approval devices 710 may take the form of a smart phone, a personal digital assistant (PDA), a mobile telephone device, a laptop, a tablet, a handheld computer, a personal media player, etc. Approval devices 710 may be used by "approvers" (users) that are designated as being responsible for approving whether pictures uploaded from user imaging terminals 720 should be used by broadcast application server 730 when creating image streams. For example, assume that the image stream is to be generated and displayed on a television by a company that is sponsoring a booth at a professional convention. In this situation, people attending the convention may take the pictures and the workers at the booth may be the approvers.

User imaging terminals 720 may include any computation or communication device, such as a communication device that is capable of communicating (directly and/or via network 750) with broadcast application server 730 and that include audio/visual recording capabilities. In one implementation, user imaging terminals 720 may take the form of a smart phone, a personal digital assistant (PDA), a mobile telephone device, and/or another type of device. Alternatively or additionally, user imaging terminals 720 may correspond to recording terminals 120 and may be, for example, fixed cameras. In this case, user imaging terminals 720 may first transmit images that are taken to a device (e.g., a mobile phone) of the user, for approval, before the user forwards the images to broadcast server 730 or the user image terminal may directly forward the image to broadcast server 730.

User imaging terminals 720 may include the ability to take pictures, such as through an integrated camera. The pictures may be transmitted to broadcast application server 730. In one implementation, the pictures may be transmitted using multimedia messaging service (MMS), which is a known way to send messages that include multimedia content to and from mobile devices. The user of user imaging terminal 720 may, for example, take a picture and then send the picture by entering an MMS "short code" that corresponds to broadcast application server 730. In this way, user imaging terminals 720, such as "common" cellular phones with picture taking ability, may be used to send images to broadcast application server 730 without requiring the installation of custom software. In another possible implementation, a custom application, compatible with broadcast application server 730, may be installed on user imaging terminals 720 and used to take and/or transmit images to broadcast application server 730. In some implementations, user imaging terminals 720 may allow the user to associate text or other information with an image before transmitting the image to broadcast application server 730.

Broadcast application server 730 may include any computation or communication device, such as a communication device that is capable of communicating (directly or via network 750) with approval devices 710, user imaging terminals 720, and display devices 740. Broadcast application server 730 may represent a single server device or a collection of multiple server devices and/or computer systems. Broadcast application server 730 may allow a user of user imaging terminal 720 to upload images (e.g., by sending MMS pictures from a cell phone to a short code associated with broadcast application server 730). Broadcast application server 730 may distribute the uploaded images to one or more approval devices 710. Broadcast application server 730 may receive indications of approval/disapproval of the images back from approval devices 710 (e.g., receipt of an appropriately formatted approval/disapproval short message service (SMS) message from the approval device 710). Broadcast application server 730 may rank and/or organize the "approved" images into an image stream that may be streamed to one or more of display devices 740. Broadcast application server 730, as will be described in more detail below, may additionally perform a number of other functions or implement other features relating to generation of an image stream.

Display devices 740 may include any computation or communication device, such as a communication device that is capable of communicating with broadcast server 730 via network 750 and is capable of displaying video and/or audio streams. In one implementation, display device 740 may take the form of a smart phone, a mobile telephone device, a television, a monitor, a personal computer, a laptop, an electronic billboard, a projector, etc. Display devices may be used to display the image stream generated by broadcast application server 730. In one implementation, display devices 740 may be one or more "large" display devices that are placed in a public location, such as a large screen display at a professional convention. Alternatively or additionally, display devices 740 may include smaller devices, such as a personal computer of a user that is not at a convention but who would like to experience the convention as it is seen by friends and co-workers. In one implementation, users of display devices 740 may sign up to receive an image stream through broadcast application server 730.

Network 750 may include a single network, multiple networks of a same type, or multiple networks of different types. For example, network 750 may include one or more of a direct connection between devices, a local area network (LAN), a wide area network (WAN) (e.g., the Internet), a metropolitan area network (MAN), a wireless network (e.g., a general packet radio service (GPRS) network), a long term evolution (LTE) network, etc.), a telephone network (e.g., a Public Switched Telephone Network or a cellular network), a subset of the Internet, an ad hoc network, a fiber optic network (e.g., a fiber optic service (FiOS) network), or any combination of the aforementioned networks. In implementations in which approval devices 710 and/or user imaging terminals 720 include mobile devices, such as cellular telephones, network 750 may particularly include a wireless network interface.

Although FIG. 7 shows example components of environment 700, in other implementations, environment 700 may include fewer components, different components, differently arranged components, or additional components than depicted in FIG. 7. Additionally, or alternatively, one or more components of environment 700 may perform one or more of the tasks described as being performed by one or more other components of environment 700. Further, in FIG. 7, approval devices 710, user imaging terminals 720, broadcast application server 730, and display devices 740 may be associated or implemented by one or more of devices 300.

Figure 8:
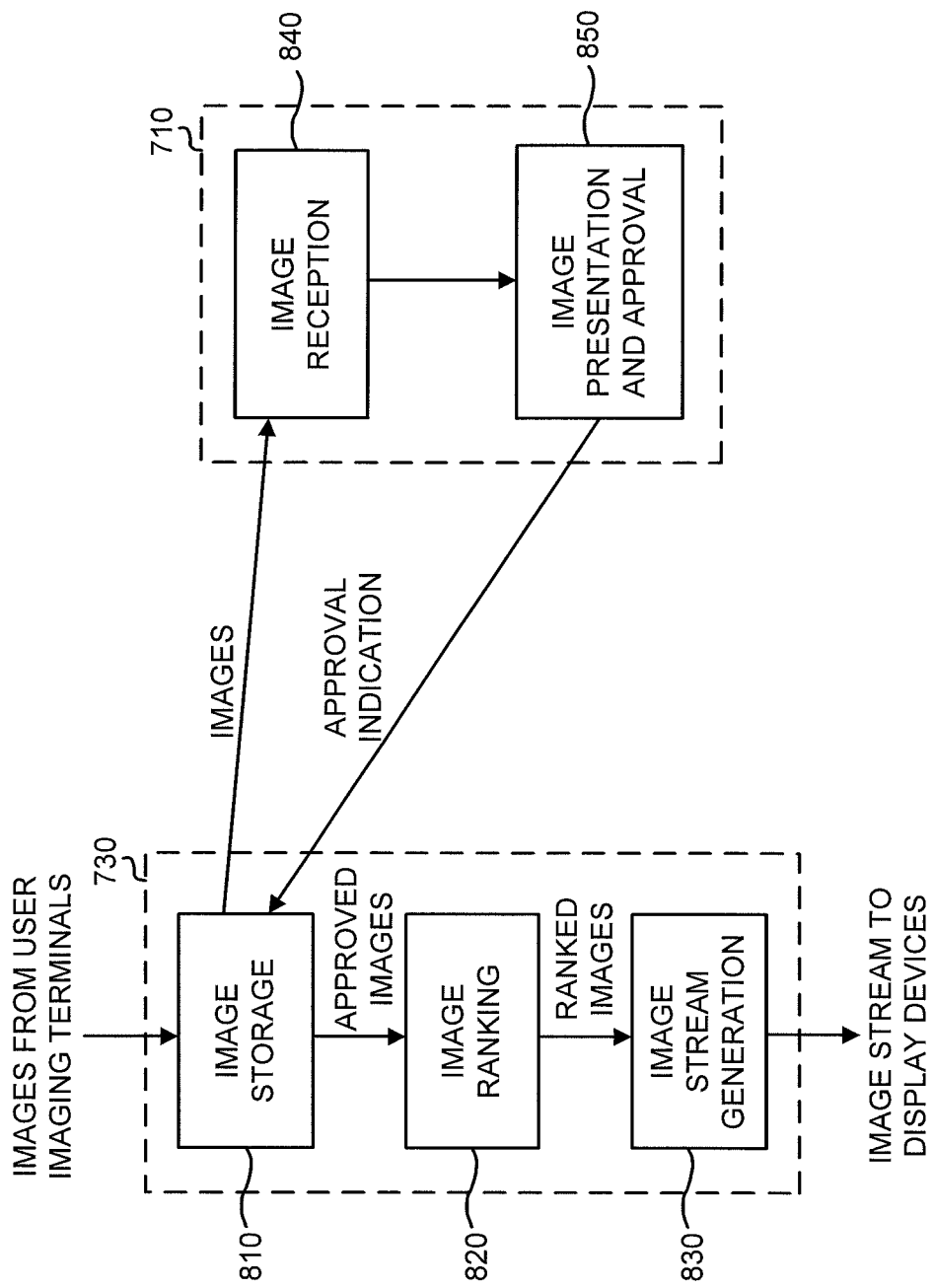
FIG. 8 is a diagram illustrating an example of conceptual components for portions of the environment shown in FIG. 7.

FIG. 8 is a diagram illustrating an example of conceptual components for portions of environment 700. Components of approval device 710 and broadcast application server 730 are particularly shown in FIG. 8.

Components of broadcast application server 730 may include image storage component 810, image ranking component 820, and image stream generation component 830. Components of approval device 710 may include image reception component 840 and image presentation and approval component 850.

Image storage component 810 may receive and store images from user imaging terminals 720. Image storage component 810 may include a database or file structure for storing the received images. Image storage component 810 may additionally associate other information with each stored image, such as information relating to the user that uploaded the image (e.g., a user name, a mobile directory number (MDN) of a user device, etc.), the location at which the image was taken, and/or the time/date at which the image was taken. Image storage component 810 may also store whether each uploaded image has been approved by one or more of approval devices 710. Initially, an uploaded image may be indicated as being not approved. In response to an approval indication from one of approval devices 710, the image status may be changed to "approved." In some implementations, information, in addition to whether an image is approved or not approved, may be provided by the users of approval devices 710. For example, the users of approval device 710 may subjectively rate the images (e.g., on a scale of 1 to 5).

Image ranking component 820 may assign a rank or priority value to approved images. The rank/priority value may be used to select which images are included in the image stream generated by image stream generation component 830. In one implementation, the rank/priority values may be selected so that the most recently uploaded images are given higher display priority. In another implementation, other factors, such as ratings of the images from the users of approval devices 710, may additionally be used to generate the rank/priority values.

Image stream generation component 830 may, based on the image rank/priority values, generate the image stream for display devices 740. The image stream may include a series of images, video, audio, and/or text messages. The image stream may generally be designed to convey the impressions of the users of user imaging terminals 720. Image stream generation component 830 may transmit the image stream to one or more display devices 740. In one implementation, display devices 740 may register with broadcast application server 730 to receive the image stream.

As is further shown in FIG. 8, image reception component 840 and image presentation and approval component 850, at approval devices 710, may interact with image storage component 810 of broadcast application server 730. Image reception component 840 and image presentation component 850 may be, for example, part of an application that is executed by approval device 710. For example, approval device 710 may include a smart phone, personal computer, tablet device, etc., on which an application is installed that implements the functionality of image reception component 840 and image presentation and approval component 850. In one implementation, image reception component 840 may use mobile device MMS capability to receive messages with attached images and mobile device SMS capability to send approval/disapproval control messages to image storage component 810.

Image reception component 840 may receive images from image storage component 810. The images may be received over network 750, such as over a wired or wireless connection. The received images may be temporarily stored by image reception component for presentation to the user.

Image presentation and approval component 850 may display the received images to the user and provide the user an opportunity to approve or disapprove each image. As previously mentioned, image presentation and approval component 850 may additionally obtain other information from the user, such as a subjective rating of the quality of the image. The approval/disapproval, and potentially other information, obtained from the user, may be transmitted back to broadcast application server 730.

Although FIG. 8 shows example conceptual components of approval devices 710 and user imaging devices 720, in other implementations, approval devices 710 and user imaging devices 720 may include fewer components, different components, differently arranged components, or additional components than depicted in FIG. 8. Additionally, or alternatively, one or more components of approval devices 710 and user imaging devices 720 may perform one or more of the tasks described as being performed by one or more other components of approval devices 710 and user imaging devices 720.

Figure 9:
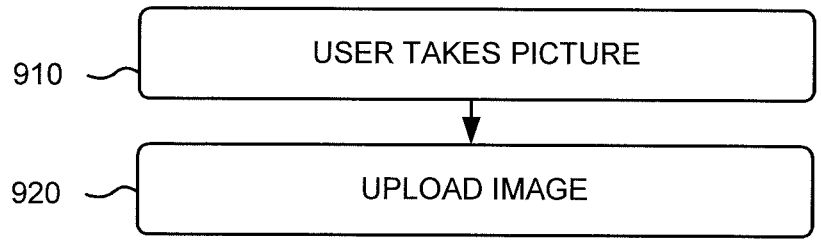
FIG. 9 is a flow chart illustrating an example of a process that may be performed at the user imaging terminals shown in FIG. 7.

FIG. 9 is a flow chart illustrating an example of a process 900 that may be performed at user imaging terminals 720.

Process 900 may include taking a picture (block 910). A user, of user imaging terminal 720, may take a picture using a camera function of user imaging terminal 720. For example, imaging terminal 720 may be a mobile phone that includes a built-in camera. Alternatively or additionally, video or audio may be recorded by user imaging terminal 720. In some implementations, a user may "tag" or otherwise markup or label photos.

The user of user imaging terminal 720 may be part of a group of people selected to take part in the image stream generated by broadcast application server 730. For example, a company that has a booth at a professional conference may ask people interested in the company or employees of the company to take pictures of their experience at the conference. As another example, people in a group that are visiting a site, such as a school group visiting an amusement park, may take pictures as they are at the amusement park.

The images taken by the users may be uploaded (block 920) to broadcast application server 730. The pictures may be uploaded using a number of potential technologies, such as MMS. For example, with MMS, the user may send the image to broadcast application server 730 by entering a short code or telephone number. Using MMS, or another standardized messaging application, to deliver the images, can be advantageous as user imaging terminal 720 may not require the installation of additional software. Alternatively, the images may be uploaded to broadcast application server 730 using software that is designed to connect with broadcast application server 730. In some implementations, additional information relating to an image may also be uploaded, such as a location tag indicating where the image was taken, a date/time stamp, etc.

Figure 10:
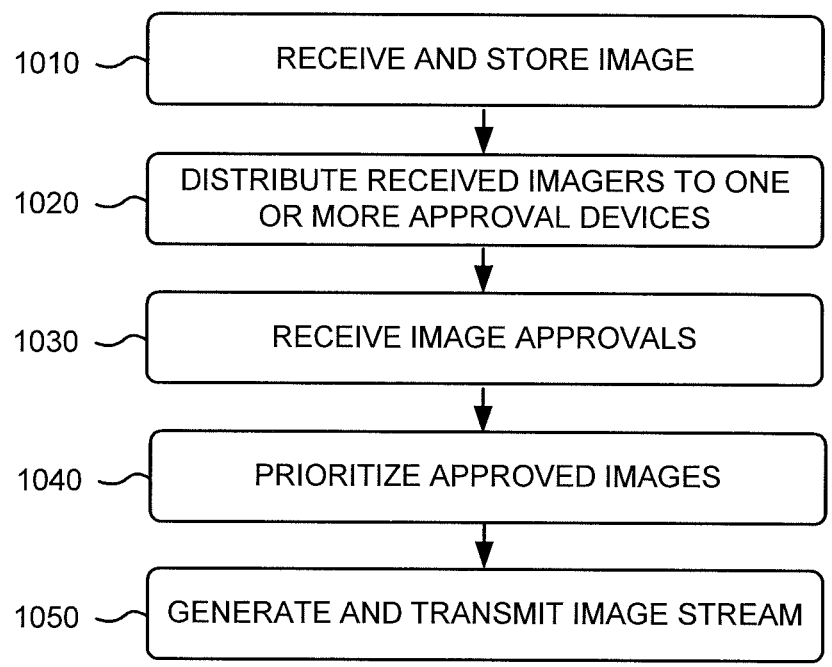
FIG. 10 is a flow chart illustrating an example of a process that may be performed by the broadcast application server shown in FIG. 7.

FIG. 10 is a flow chart illustrating an example of a process 1000 that may be performed by broadcast application server 730.

Broadcast application server 730 may receive and store the images uploaded from user imaging terminals 720 (block 1010). In some implementations, such as those in which any user can submit an image (e.g., an MMS based image submission system), only images from certain users (such as those associated with a whitelist of telephone numbers) may be stored. In this way, images from non-approved users may be filtered and rejected.

Process 1000 may further include distributing the received images to one or more approval devices 710. For example, image storage component 810 of broadcast imaging server 730 may transmit the received images to one of approval devices 710. Alternatively, the image may be transmitted to multiple approval devices 710 and, for example, the first approval/disapproval response may be used for the image.

Process 1000 may further include receiving the image approvals (or disapprovals) from approval devices 710 (block 1030). In some implementations, information other than merely whether an image is approved or disapproved may be received. For example, a subjective rating of the image (e.g., a numeric rating on a scale of one to five) or comments relating to the image may also be received from approval devices 710.

Process 1000 may further include prioritizing the approved images (block 1040). The prioritization may include, for example, ranking or otherwise scoring the images to assist in the generation of the image stream. In one implementation, the rank or score value may be assigned by image ranking component 820 so that more recent images are given a higher rank and are thus more likely to be incorporated into the image stream. Other information, such as the subjective rating of the image may alternatively or additionally be used when generating the ranking values. In this situation, images that are rated, by approval devices 710, as being of a higher quality may be given preference for display in the image stream or may be displayed longer in the image stream.

Other factors may additionally be used when generating the ranking values. For example, the number of received images that have not yet been presented in the image stream (the image stream queue depth) may be used so that the images in the stream may be displayed faster (i.e., each image presented for less time) when many images are waiting to be shown. Another example of information that may be used when generating the ranking values is the identity of the uploading user. Certain users may be "favored" users and given greater preferences in having their images incorporated into the image stream.

Process 1000 may further include generating and transmitting the image stream (block 1050). The image stream may be transmitted, by broadcast application server 730, to all display devices 740 that are registered to receive the image stream. The image stream may be generated based on the prioritized and approved images. As previously mentioned, the image stream may include a broadcast that displays, for various amounts of time, the approved images as a sequence of images designed to capture the collective experience of the users of user imaging terminals 720. Information other than images, such as text, video, and/or audio may also be included in the image stream.

In some implementations, broadcast application server 730 may perform other functions relating to the generation of the image stream. For example, broadcast application server 730 may allow users to vote on images in the stream to determine which image will "win". As another example, some users, such as an administrator, may be able to enter text that is shown in the images stream. Additionally, broadcast application server 730 may be configured to generate the image stream so that different effects, such as different image transition visual effects, may be used.

Figure 11:
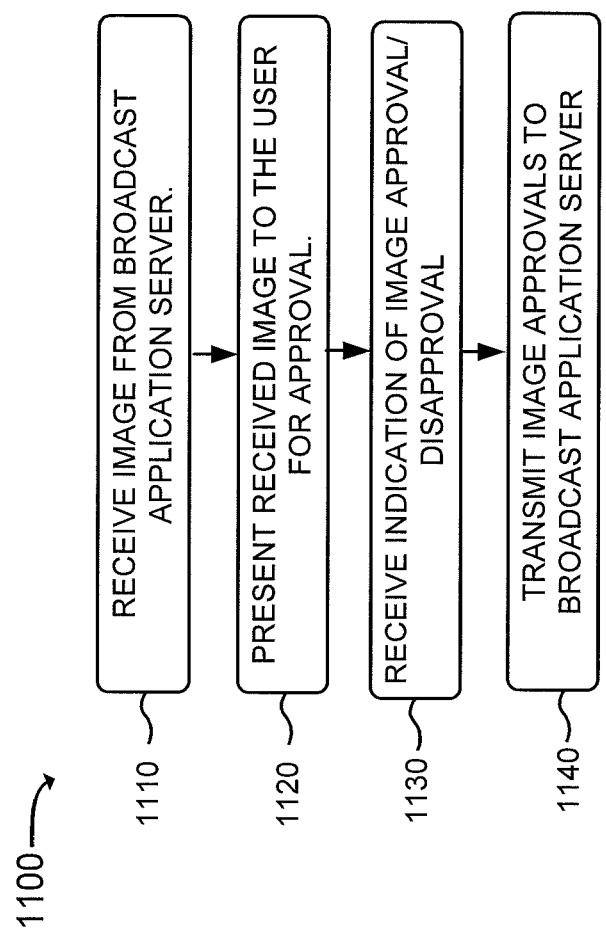
FIG. 11 is a flow chart illustrating an example of a process that may be performed by an approval device shown in FIG. 7.

FIG. 11 is a flow chart illustrating an example of a process 1100 that may be performed by an approval device 710.

Figure 12:
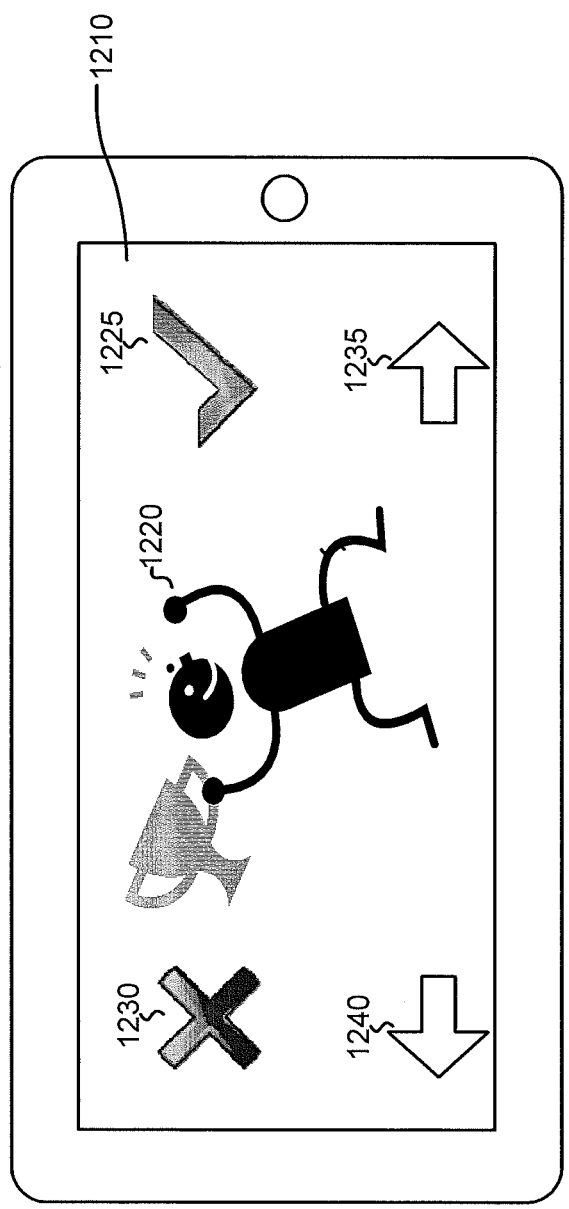
FIG. 12 is a diagram illustrating an example interface that may be presented by an approval device to obtain approval for an image.

Process 1100 may include receiving an image from broadcast application server 730 (block 1110) and presenting the image to the user for approval (block 1120). FIG. 12 is a diagram illustrating an example interface that may be presented by an approval device 710 to obtain approval for an image. In this example, approval device 710 may be a smart phone that includes a touch sensitive interface 1210. As shown, interface 1210 displays the image 1220 and a number of icons through which the user may interact. For example, approval icon 1225 may be used to indicate approval of the image by the user, rejection icon 1230 may be used to indicate rejection (disapproval) of the image by the user, next image icon 1235 may be used to display the next image, and previous image icon 1240 may be used to display the previous image. Users deciding whether to approve (approval icon 1225) or disapprove (rejection icon 1230) image 1220 may make the decision based on a number of possible factors, such as based on whether the content is non-offensive or is relevant to the subject of the image stream.

The indication of whether an image is approved or disapproved may be received by approval device 710 (block 1130). For example, the user may touch approval icon 1225 or rejection icon 1230 to approve or disapprove the image, respectively. As mentioned previously, in some implementations, information, in addition to the indications of user approval/disapproval, such as a subjective user rating of the image, may also be entered, such as through interface 1210.

Process 1100 may further include transmitting the users' indications of approval or disapproval to broadcast application server 730 (block 1140). In implementations in which information in addition to the users' indication of approval/disapproval is input, such as user ratings, this information may also be transmitted to broadcast application server 730.

FIG. 13 is a diagram that illustrates an example of an application of broadcasting content using broadcast application server 730. In FIG. 13, assume that a number of users 1310, which include attendees at a professional conference, have agreed to use their mobile phones as user imaging terminals 720. Each of users 1310 may be, for example, an employee of a particular company or a member of a particular group. As users 1310 move about the professional conference, they may take pictures of scenes that they find interesting. The pictures of the scenes may thus collectively represent a day at the professional conference.

Broadcast application server 730 may be a self-serve online application that was configured by an employee of the particular company to enable generation of an image stream based on the images taken by users 1310. As part of the configuration, approval users 1320 may be designated and given instructions on the criteria to use when approving images from users 1310. Additionally, approval users 1320 may download and install software, such as software installed on a smart phone or laptop computer, to perform the image approval process (e.g., process 1100, FIG. 11).

Images uploaded by users 1310, to broadcast application server 730, may be sent to approval users 1320 for approval/disapproval. The approval users 1320 may approve/disapprove the images in near real-time. Based on the approved images, broadcast application server 730 may generate image stream 1330. Image stream 1330 may include one or more images, videos, text, and/or audio that is presented at display device 1340. For example, images taken by users 1310, showing scenes from the professional conference, may be shown and occasionally updated at display device 1340. Two images, images 1332 and 1334, of people at the professional conference, are shown in FIG. 13. Display device 1340 may be a large screen television at the professional conference. Other display devices, such as personal computers of employees of the particular company that were not able to attend the professional conference, may also receive the image stream from broadcast application server 730.

Broadcast application server 730, as shown in FIG. 13, may be used by organizations, individuals, or other entities to enable these entities to create on-demand image streams relating to an event as that event is seen by one or more users. Content for the image stream may be approved by one or more designated approval users on a near-real time basis.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 4, 5, and 9-11, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code-it being understood that software and control hardware can be designed to implement the systems and methods based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a server device, images, associated with an event and captured by a plurality of first devices that are operated by a corresponding plurality of first users that are attending the event;
   transmitting, by the server device, the images to one or more second devices associated with second users, wherein the second devices are not the same devices as the first devices;
   receiving, by the server device, indications from the one or more second devices, of whether the images are approved by the second users for incorporation into an image stream of the event;
   ranking the approved images, based on information received from the one or more second devices, to obtain ranking values that are used to prioritize incorporation of the approved images into the image stream;
   generating, by the server device, the image stream of the event and including the images captured by the plurality of first devices, the image stream being generated based on the images that are approved by the second users and the ranking values; and
   transmitting, by the server device, the image stream to one or more display devices.

2. The methods of claim 1, where ranking the approved images further includes ranking more recently received approved images higher than earlier received images.

3. The method of claim 1, where ranking the approved images further includes ranking the approved images based on an identity of a user who captured the image.

4. The method of claim 1, where receiving the images from the plurality of first devices includes receiving the images as multimedia message service (MMS) images.

5. The method of claim 1, where the images are received from the plurality of first devices as pictures taken from portable images devices.

6. The method of claim 1, where the one or more second users are users that are designated by an administrator as users that are to approve or disapprove the images.

7. The method of claim 1, where the images stream includes one or more of images, videos, audio, or text.

8. The method of claim 1, where receiving the images from the plurality of first devices further includes:
   filtering the images based on a telephone number associated with the first devices.

9. The method of claim 1, where the image stream includes a sequential presentation of the images from the first users associated with the first devices.

10. The method of claim 1, wherein generating the image stream further includes:
    incorporating text, generated by the at least one of the plurality of first users, into the image stream.

11. A system comprising:
    a memory to store computing instructions; and
    a processor, connected to the memory, to execute the computing instructions to:
      receive images captured by a plurality of first devices and relating to an event being attended by first users associated with the first devices;
      transmit the images to one or more second devices, associated with one or more second users that are designated to approve the images received from the plurality of first devices, wherein the second devices are different than the first devices;
      receive indications, from the second users, of whether the images are approved by the second users for incorporation into an image stream of the event;
      rank the received images that are indicated as being approved by the one or more second users;
      generate the image stream of the event, based on the ranked images; and
      transmit the image stream of the event to one or more display devices.

12. The system of claim 11, where, when generating the image stream, the processor is to:
    incorporate text into the image stream, where the text is created by the first users.

13. The system of claim 11, where, when ranking the images, the processor is to:
    rank more recently received images higher than earlier received images.

14. The system of claim 11, where, when ranking the images, the processor is to:
    rank the approved images based on identities of the first users, associated with the plurality of first devices, that captured the images.

15. The system of claim 11, where when receiving the images from the plurality of first users, the processor is to:
    receive the images as multimedia message service (MMS) images.

16. The system of claim 11, where the first devices include portable imaging devices.

17. The system of claim 11, where one or more second users are users that are designated by the administrator as users that are to approve the images.

18. The system of claim 11, where the image stream includes one or more of images, videos, audios, or text.

19. A non-transitory computer-readable media storing programming instructions for execution by one or more processors, the programming instructions including:
    instructions to receive images, associated with an event and captured by a plurality of first devices that are operated by a corresponding plurality of first users that are attending the event;

instructions to transmit the received images to one or more second devices associated with one or more second users, wherein the second devices are not the same devices as the first devices;

instructions to receive indications, from the second devices, of whether the images are approved by the second users for incorporation into an image stream of the event;

instructions to generate the image stream of the event including the images captured by the plurality of first devices, the image stream being generated based on the images that are approved by the second users; and instructions to transmit the image stream to one or more display devices.

20. The non-transitory computer-readable media claim of 19, further including:

instruction to rank the approved images to obtain ranking values that are used to prioritize incorporation of the approved images into the image stream.

21. The non-transitory computer-readable media of claim 19, where the instructions to rank the approved images includes instructions to rank more recently received approved images higher.

22. The non-transitory computer-readable media of claim 19, where the instructions to rank the approved images includes instructions to rank the approved images based on an identity of a user who captured the image.

23. The non-transitory computer-readable media of claim 19, where the instructions to receive the images from the plurality of first users includes instructions to receive the images as multimedia message services (MMS) images.

24. The non-transitory computer-readable media of claim 19, where the images are received from the first devices as pictures taken from portable imaging devices.

25. The non-transitory computer-readable media of claim 19, wherein the instructions to generate the image stream include instructions to incorporate text, generated by the at least one of the plurality of first users, into the image stream.

* * * * *